United States Patent
DeMonte et al.

(10) Patent No.: US 8,316,660 B2
(45) Date of Patent: Nov. 27, 2012

(54) DEFROST BYPASS DEHUMIDIFIER

(75) Inventors: Todd DeMonte, Cottage Grove, WI (US); Scott E. Sloan, Freeport, IL (US); Steve S. Dingle, McFarland, WI (US); Timothy S. O'Brien, Deforest, WI (US); Phillip R. Steinmetz, Stoughton, WI (US)

(73) Assignee: Technologies Holdings Corp., Houston, TX (US)

( * ) Notice: Subject to any disclaimer, the term of this patent is extended or adjusted under 35 U.S.C. 154(b) by 325 days.

(21) Appl. No.: 12/834,098

(22) Filed: Jul. 12, 2010

(65) Prior Publication Data
US 2010/0275630 A1    Nov. 4, 2010

Related U.S. Application Data

(63) Continuation-in-part of application No. 12/473,874, filed on May 28, 2009, which is a continuation-in-part of application No. 11/872,106, filed on Oct. 15, 2007, now Pat. No. 7,540,166, which is a continuation of application No. 11/280,056, filed on Nov. 16, 2005, now Pat. No. 7,281,389.

(51) Int. Cl.
*F25D 21/00*    (2006.01)

(52) U.S. Cl. ............... 62/272; 62/277; 62/498

(58) Field of Classification Search .......... 62/272, 62/173, 186, 277, 90, 92, 93, 498, 507, 292, 62/185; 236/44 C, 91 D
See application file for complete search history.

(56) References Cited

U.S. PATENT DOCUMENTS

| | | | |
|---|---|---|---|
| 2,093,725 A | | 9/1937 | Hull |
| 2,128,641 A | | 8/1938 | Folsom |
| 2,286,605 A | * | 6/1942 | Crawford ............ 62/170 |
| 2,438,120 A | | 3/1948 | Freygang |
| 2,682,758 A | | 7/1954 | Harris |
| 2,763,132 A | | 9/1956 | Jue |
| 2,968,167 A | | 1/1961 | Raney |
| 2,975,609 A | | 3/1961 | Allander et al. |
| 3,496,731 A | | 2/1970 | Sholtes |
| 3,640,090 A | | 2/1972 | Ares |
| 3,738,117 A | | 6/1973 | Engel |
| 3,739,487 A | | 6/1973 | Clark |
| 3,741,290 A | | 6/1973 | Nenadal |
| 3,867,979 A | | 2/1975 | Carrasse et al. |

(Continued)

FOREIGN PATENT DOCUMENTS

CA    1 301 739 C    5/1992

(Continued)

OTHER PUBLICATIONS

EBAC Industrial Products, Inc., Orion Dehumidifier Flyer and Drawing, date unknown, Bishop Aukland, England.

(Continued)

*Primary Examiner* — Mohammad Ali
(74) *Attorney, Agent, or Firm* — Andrus, Sceales, Starke & Sawall, LLP

(57) ABSTRACT

A defrost bypass dehumidifier includes an air flow path with first, second and third segments in series from upstream to downstream and passing ambient air respectively to an evaporator coil then to a condenser coil and then discharging same. The air flow path has a bypass segment passing ambient air to the evaporator coil in parallel with the noted first air flow path segment.

20 Claims, 23 Drawing Sheets

U.S. PATENT DOCUMENTS

| | | | |
|---|---|---|---|
| 3,899,023 | A | 8/1975 | Zander et al. |
| 3,938,348 | A | 2/1976 | Rickert |
| 4,176,525 | A | 12/1979 | Tucker et al. |
| 4,178,767 | A | 12/1979 | Shaw |
| 4,193,443 | A | 3/1980 | Nanaumi et al. |
| 4,214,454 | A | 7/1980 | Taylor |
| 4,250,629 | A | 2/1981 | Lewis |
| 4,428,205 | A * | 1/1984 | Doderer ............ 62/93 |
| 4,428,207 | A | 1/1984 | Hall |
| 4,432,147 | A | 2/1984 | Chen et al. |
| 4,531,890 | A | 7/1985 | Stokes |
| 4,607,498 | A | 8/1986 | Dinh |
| 4,635,446 | A | 1/1987 | Meckler |
| 4,712,382 | A | 12/1987 | Le Clear |
| 4,738,120 | A | 4/1988 | Lin |
| 4,883,329 | A | 11/1989 | Flannery et al. |
| 4,917,174 | A | 4/1990 | Ring |
| 4,928,498 | A | 5/1990 | Gossler |
| 5,031,411 | A * | 7/1991 | Gehring et al. ............ 62/93 |
| 5,069,691 | A | 12/1991 | Travis et al. |
| 5,070,703 | A | 12/1991 | Wilkinson |
| 5,117,651 | A | 6/1992 | Suh |
| 5,119,571 | A * | 6/1992 | Beasley ............ 34/446 |
| 5,230,723 | A | 7/1993 | Travis et al. |
| 5,275,233 | A * | 1/1994 | Little ............ 165/111 |
| 5,299,431 | A | 4/1994 | Iritani et al. |
| 5,309,725 | A | 5/1994 | Cayce |
| 5,327,740 | A | 7/1994 | Ogasawara et al. |
| 5,346,127 | A | 9/1994 | Creighton |
| 5,400,607 | A * | 3/1995 | Cayce ............ 62/90 |
| 5,431,890 | A | 7/1995 | Crossland et al. |
| 5,433,763 | A | 7/1995 | Shagott et al. |
| 5,443,624 | A | 8/1995 | Claesson |
| 5,553,462 | A | 9/1996 | Taylor |
| 5,588,985 | A | 12/1996 | Shagott et al. |
| 5,593,470 | A | 1/1997 | Shagott et al. |
| 5,611,209 | A | 3/1997 | Ogasawara |
| 5,634,353 | A | 6/1997 | Hallin et al. |
| 5,651,258 | A * | 7/1997 | Harris ............ 62/90 |
| 5,666,813 | A * | 9/1997 | Brune ............ 62/90 |
| 5,689,962 | A * | 11/1997 | Rafalovich ............ 62/90 |
| 5,709,736 | A | 1/1998 | Fujimura |
| 5,727,623 | A | 3/1998 | Yoshioka et al. |
| 5,752,389 | A | 5/1998 | Harper |
| 5,794,453 | A | 8/1998 | Barnwell |
| 5,813,089 | A | 9/1998 | Nolan et al. |
| 5,890,368 | A | 4/1999 | Lakdawala |
| 5,901,565 | A | 5/1999 | Morton, Jr. |
| 5,953,926 | A | 9/1999 | Dressler et al. |
| 5,975,191 | A | 11/1999 | Ohashi et al. |
| 6,021,644 | A | 2/2000 | Ares et al. |
| 6,131,653 | A | 10/2000 | Larsson |
| 6,170,271 | B1 | 1/2001 | Sullivan |
| 6,321,558 | B1 * | 11/2001 | Pruse ............ 62/324.6 |
| 6,427,454 | B1 * | 8/2002 | West ............ 62/93 |
| 6,498,876 | B1 | 12/2002 | Liu et al. |
| 6,751,964 | B2 | 6/2004 | Fischer |
| 6,796,896 | B2 | 9/2004 | Laiti |
| 6,826,921 | B1 * | 12/2004 | Uselton ............ 62/176.6 |
| 6,895,774 | B1 * | 5/2005 | Ares et al. ............ 62/332 |
| 7,191,604 | B1 | 3/2007 | Wiggs |
| 7,194,870 | B1 | 3/2007 | O'Brien et al. |
| 7,246,503 | B1 | 7/2007 | O'Brien et al. |
| 7,281,389 | B1 | 10/2007 | O'Brien et al. |
| 7,331,759 | B1 | 2/2008 | Tejeda |
| D572,356 | S | 7/2008 | Harber |
| 7,540,166 | B2 | 6/2009 | O'Brien et al. |
| 2003/0126876 | A1 | 7/2003 | Maisotsenko et al. |
| 2005/0091993 | A1 | 5/2005 | Paradis |
| 2007/0012060 | A1 | 1/2007 | Simons |
| 2007/0193287 | A1 | 8/2007 | Ishida et al. |
| 2009/0205354 | A1 | 8/2009 | Brown |

FOREIGN PATENT DOCUMENTS

| | | |
|---|---|---|
| CA | 2 654 674 A1 | 8/2009 |
| DE | 2149548 | 4/1972 |
| DE | 2413618 | 9/1975 |
| DE | 8707953 | 7/1988 |
| DE | 19731369 | 7/1998 |
| EP | 0231789 | 8/1987 |
| EP | 1028891 | 1/2004 |
| GB | 1400255 | 7/1975 |
| JP | 55-107852 | 8/1980 |
| JP | 57014135 | 1/1982 |
| JP | 60259848 | 12/1985 |
| JP | 61-093332 | 5/1986 |
| JP | 1067552 | 3/1989 |
| JP | 01200166 | 8/1989 |
| JP | 02242052 | 9/1990 |
| JP | 03129260 | 6/1991 |
| JP | 04080581 | 3/1992 |
| JP | 04214167 | 8/1992 |
| JP | 05099514 | 4/1993 |
| JP | 05322412 | 12/1993 |
| JP | 8-145414 | 6/1996 |
| JP | 9-89297 | 4/1997 |
| JP | 10-238810 | 9/1998 |
| JP | 2000-234761 | 8/2000 |
| JP | 2001-065917 | 3/2001 |
| JP | 2001-182965 | 7/2001 |
| JP | 2001-270326 | 10/2001 |
| JP | 2002-061912 | 2/2002 |
| JP | 2002-188827 | 7/2002 |
| JP | 2002-267204 | 9/2002 |
| JP | 2002-355527 | 12/2002 |
| JP | 2003-024737 | 1/2003 |
| JP | 2004-271034 | 9/2004 |
| JP | 2004-305995 | 11/2004 |
| WO | 91/16584 | 10/1991 |
| WO | 96/11049 | 4/1996 |
| WO | 2007/008948 | 1/2007 |

OTHER PUBLICATIONS

Michael Best & Friedrich, LLP, Answer to First Amended Complaint and Affirmative Defenses, Jul. 13, 2009, Milwaukee, Wisconsin, USA.

Kilpatrick Stockton, LLP, Abatement Technologies, Inc.'s First Supplemental Responses to Plaintiff's Interrogatories Nos. 5 and 6, Dec. 21. 2009, Atlanta, Georgia, USA.

Bereskin & Parr, Preliminary Patentability Search Report, Dec. 13, 2007, Toronto, Ontario, Canada.

Dehumidification, Hawaii Commercial Guidelines for Energy Efficiency, 2003.

Desert Aire IH/WC Series Dehumidifiers Brochure, 2005.

Fan Performance Characteristics of Centrifugal Fans, Engineering Data, 2000.

Kilpatrick Stockton, LLP, Defendant's First Supplemental Disclosure of Invalidity Contentions for U.S. Patent Nos. 7,246,503; 7,281,389 and 7,540,166, Apr. 23. 2010.

Fan Selection and Sizing to Reduce Inefficiency and Low Frequency Noise Generation, Fan Noise, 2003.

Understanding Centrifugal Fans, Plant Engineering, Feb. 6, 1995.

Validation of a Dynamic Model for a Dehumidifier Wood Drying Kiln, Drying Technology, 1999.

Energy Efficient Electric Drying Systems for Industry, Drying Technology, 1995.

European Search Report received in corresponding European Patent Application No. 10005307.3, dated Sep. 10, 2010.

Material for Aquatrap AT1005 LGR Dehumidifier cited in the reexamination proceeding for U.S. Patent No. 7,540,166, Abatement Technologies, Inc., Copyright 2007, 4 pages.

Material for Squirrel Cage Blower cited in the reexamination proceeding for U.S. Patent No. 7,246,503, Fluent, Inc., Copyright 2001, 2 pages.

Amendments to claims and specification in corresponding European Patent Application No. 10005307.3 dated Jun. 7, 2011.

Kilpatrick Stockton, LLP, Answers to Complaint, Affirmative Defenses and Counterclaims, dated Feb. 4, 2010.

Merchant & Gould, P.C., Answer and Counterclaims, dated Feb. 4, 2010.

Kilpatrick Stockton, LLP, Defendants' First Supplemental Disclosure of Invalidity Contentions for U.S. Patent Nos. 7,246,503, 7,281,389 and 7,540,166, dated Apr. 23, 2010.

* cited by examiner

DEFROST BYPASS DEHUMIDIFIER

CROSS-REFERENCE TO RELATED APPLICATIONS

This application is a continuation-in-part of U.S. patent application Ser. No. 12/473,874, filed May 28, 2009, which is a continuation-in-part of U.S. patent application Ser. No. 11/872,106, filed Oct. 15, 2007, now U.S. Pat. No. 7,450,166, issued Jun. 2, 2009, which is a continuation of U.S. patent application Ser. No. 11/280,056, filed Nov. 16, 2005, now U.S. Pat. No. 7,281,389, issued Oct. 16, 2007. Reference is also made to U.S. patent application Ser. No. 11/280,055, filed Nov. 16, 2005, now U.S. Pat. No. 7,194,870, issued Mar. 27, 2007, and U.S. patent application Ser. No. 11/280,054, filed Nov. 16, 2005, now U.S. Pat. No. 7,246,503, issued Jul. 24, 2007. All of the noted applications and patents are incorporated herein by reference.

BACKGROUND AND SUMMARY

Dehumidifiers are known in the prior art. A compressor delivers hot compressed refrigerant gas. A condenser receives the refrigerant gas from the compressor and condenses same to hot refrigerant liquid. An expansion device receives the refrigerant liquid from the condenser and expands same to drop the temperature and pressure of the liquid. An evaporator receives the cool liquid refrigerant from the expansion device and evaporates same to cold gas refrigerant, which is returned to the compressor to complete the refrigeration cycle. Air flow is directed across the evaporator to cool the air below the dew point such that water vapor in the air is condensed to liquid to dehumidify the air. The dehumidified air is then directed across the condenser to warm the air.

The present invention arose during continuing development efforts directed toward improved performance and efficiency in a dehumidifier.

BRIEF DESCRIPTION OF THE DRAWINGS

Parent U.S. patent application Ser. No. 12/473,874

FIG. 1 shows a dehumidifier known in the prior art and is taken from FIG. 1 of U.S. Pat. No. 5,031,411, incorporated herein by reference.

FIG. 2 is a schematic illustration of a dehumidification system known in the prior art.

FIG. 3 is a perspective view showing a dehumidifier, including portable cabinet, known in the prior art.

FIG. 4 shows the dehumidifier of FIG. 3 partially broken away, showing prior art.

FIG. 5 is a side view of the dehumidifier of FIG. 4, showing prior art.

FIG. 6 is a perspective view of a dehumidifier, including portable cabinet.

FIG. 7 is a top elevation view of the dehumidifier of FIG. 6.

FIG. 8 is a side view, partially broken away, of the dehumidifier of FIG. 6.

FIG. 9 is a perspective view, partially broken away, of the dehumidifier of FIG. 6.

FIG. 10 is a schematic illustration of a dehumidifier.

FIG. 11 is like FIG. 8 and shows a further embodiment.

FIG. 12 is an end view, partially broken away, of the dehumidifier of FIG. 9.

FIG. 13 is a side view, partially broken away, of a portion of the dehumidifier of FIG. 9.

FIG. 14 is a perspective view of a portion of the structure of FIG. 9.

FIG. 15 is an end view of the structure of FIG. 14.

FIG. 16 is an enlarged perspective view of a portion of the structure of FIG. 9.

FIG. 17 is a top view of a portion of the structure of FIG. 14.

FIG. 18 is a perspective view of a portion of the structure of FIG. 14.

FIG. 19 is an exploded perspective view of the structure of FIG. 14.

FIG. 20 is a schematic illustration of a dehumidification system.

FIG. 21 is a side view, partially broken away, of a dehumidifier, including portable cabinet.

FIG. 22 is an enlarged view of section 22-22, taken in FIG. 21, showing a bypass door in an open position.

FIG. 23 is an enlarged view of section 22-22, taken in FIG. 21, showing the bypass door in a closed position.

FIG. 24 is a rear view, partially broken away, of the dehumidifier of FIG. 21.

FIG. 25 is top view of the dehumidifier of FIG. 21.

FIG. 26 is a flow chart illustrating steps in a method.

Present Application

Figure 6:
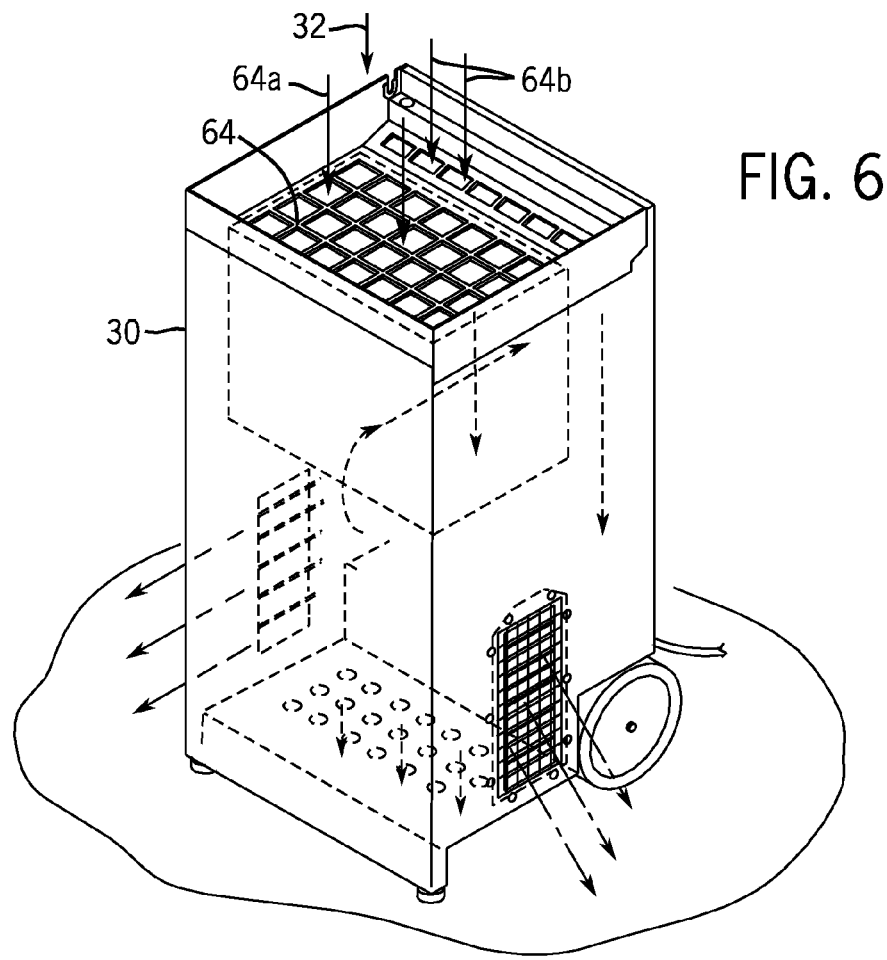
Figure 7:
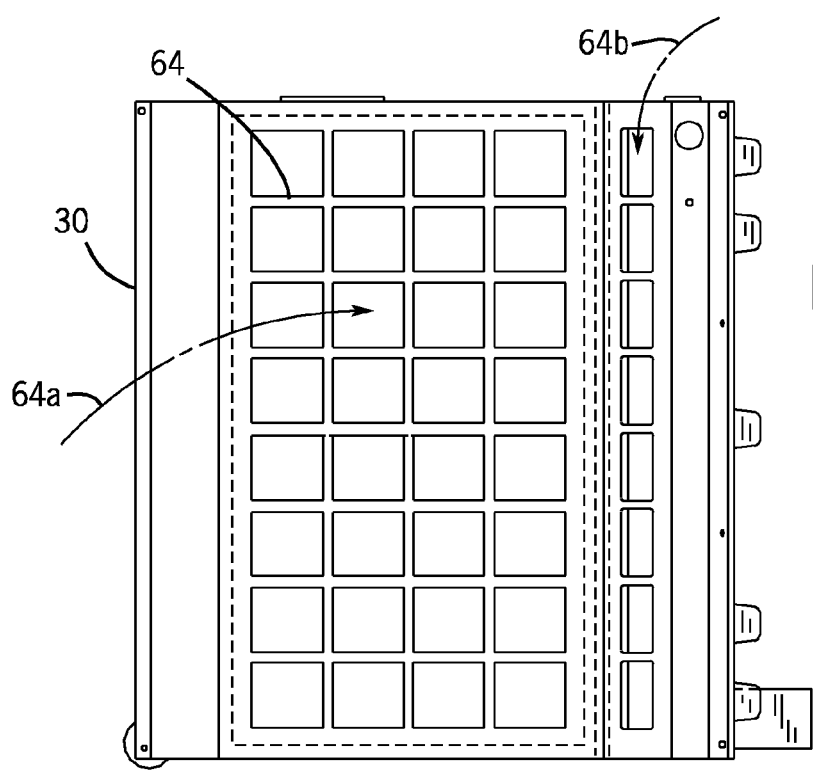
Figure 10:
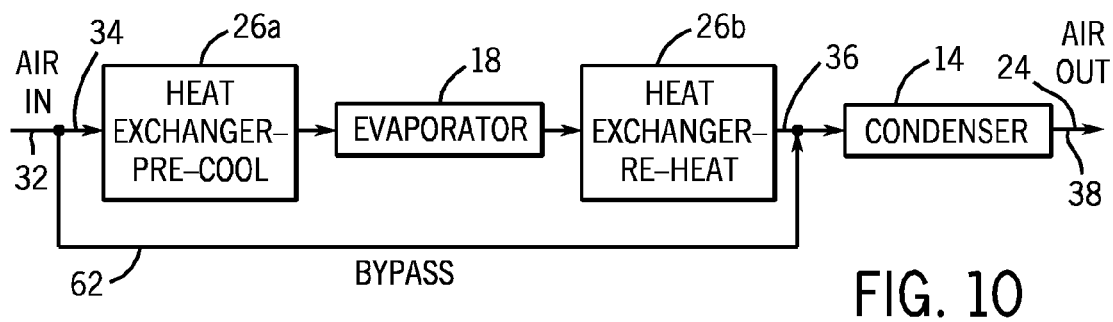
Figure 20:
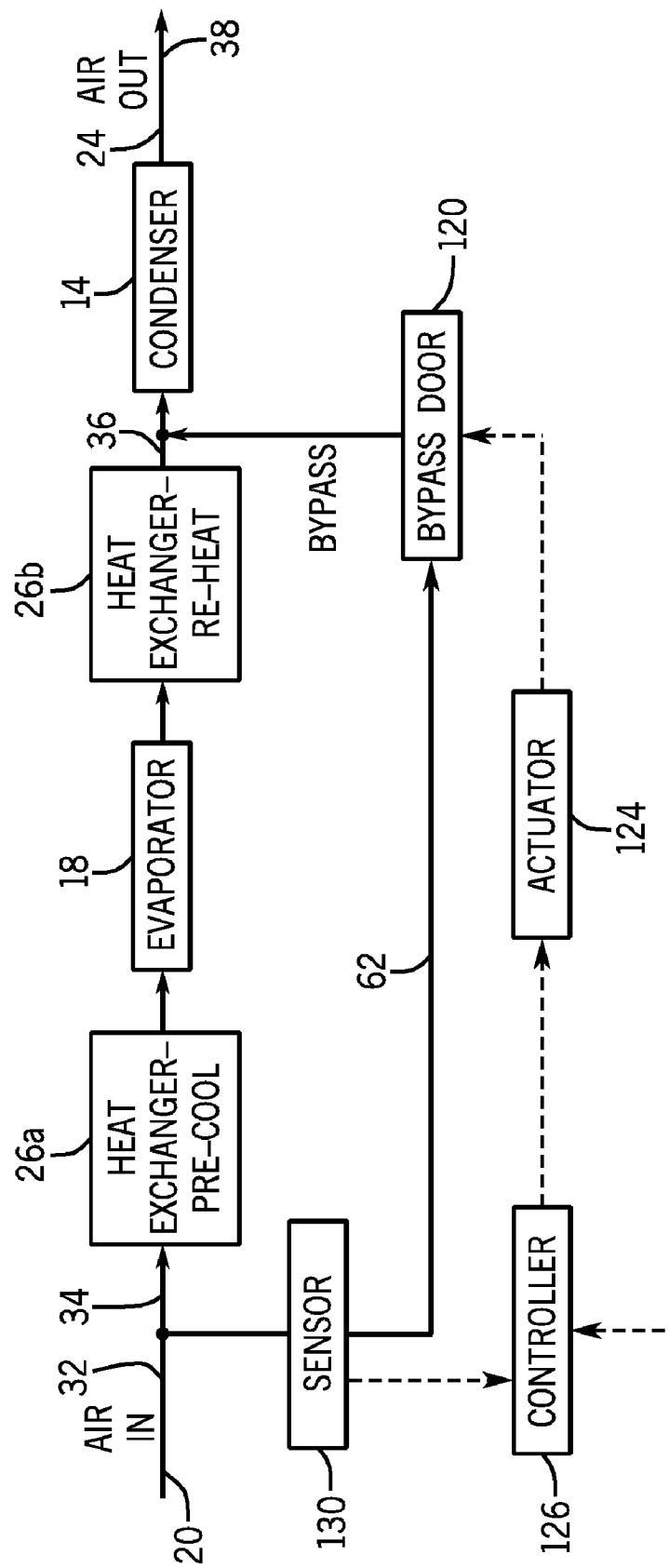
Figure 21:
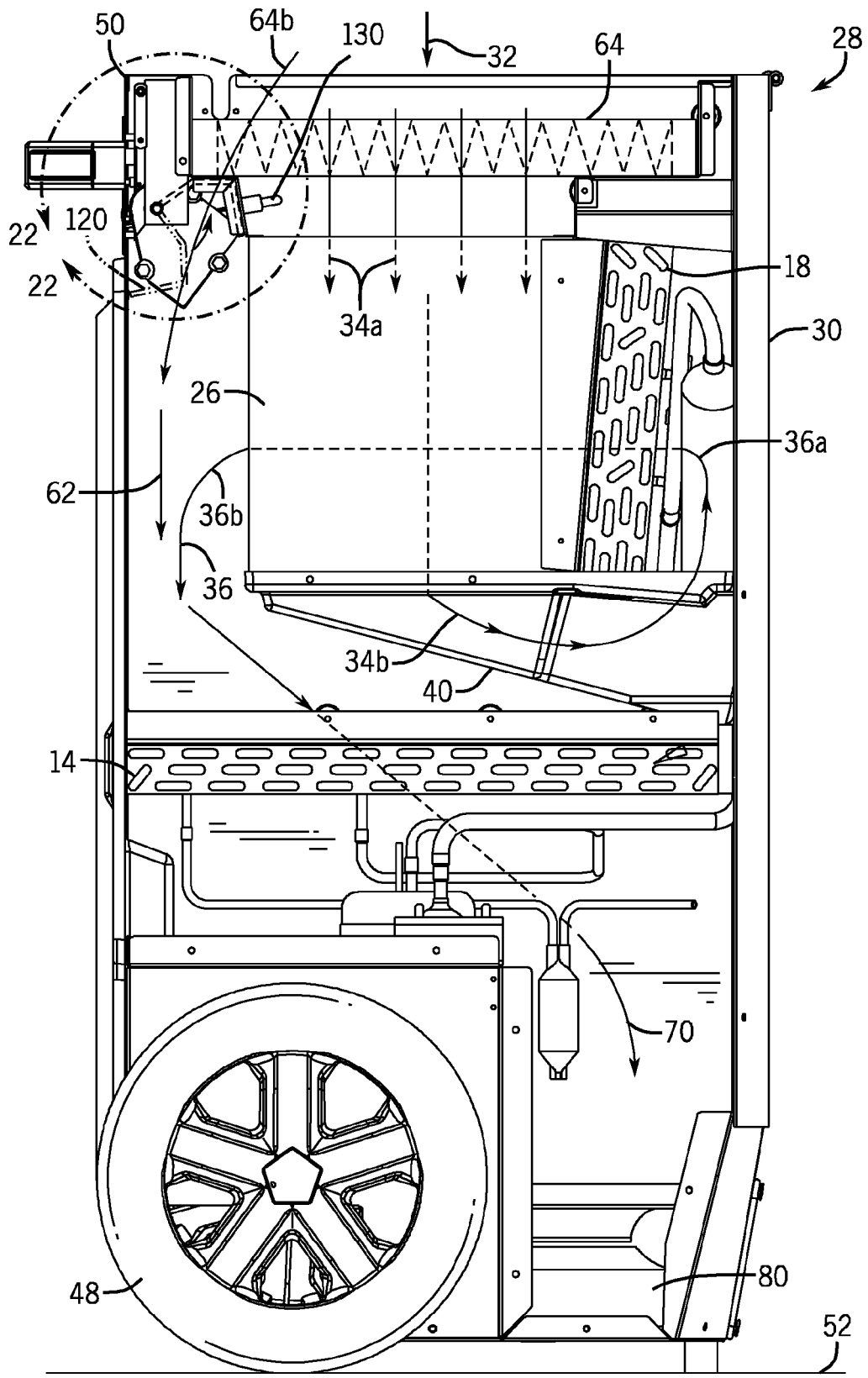
Figure 22:
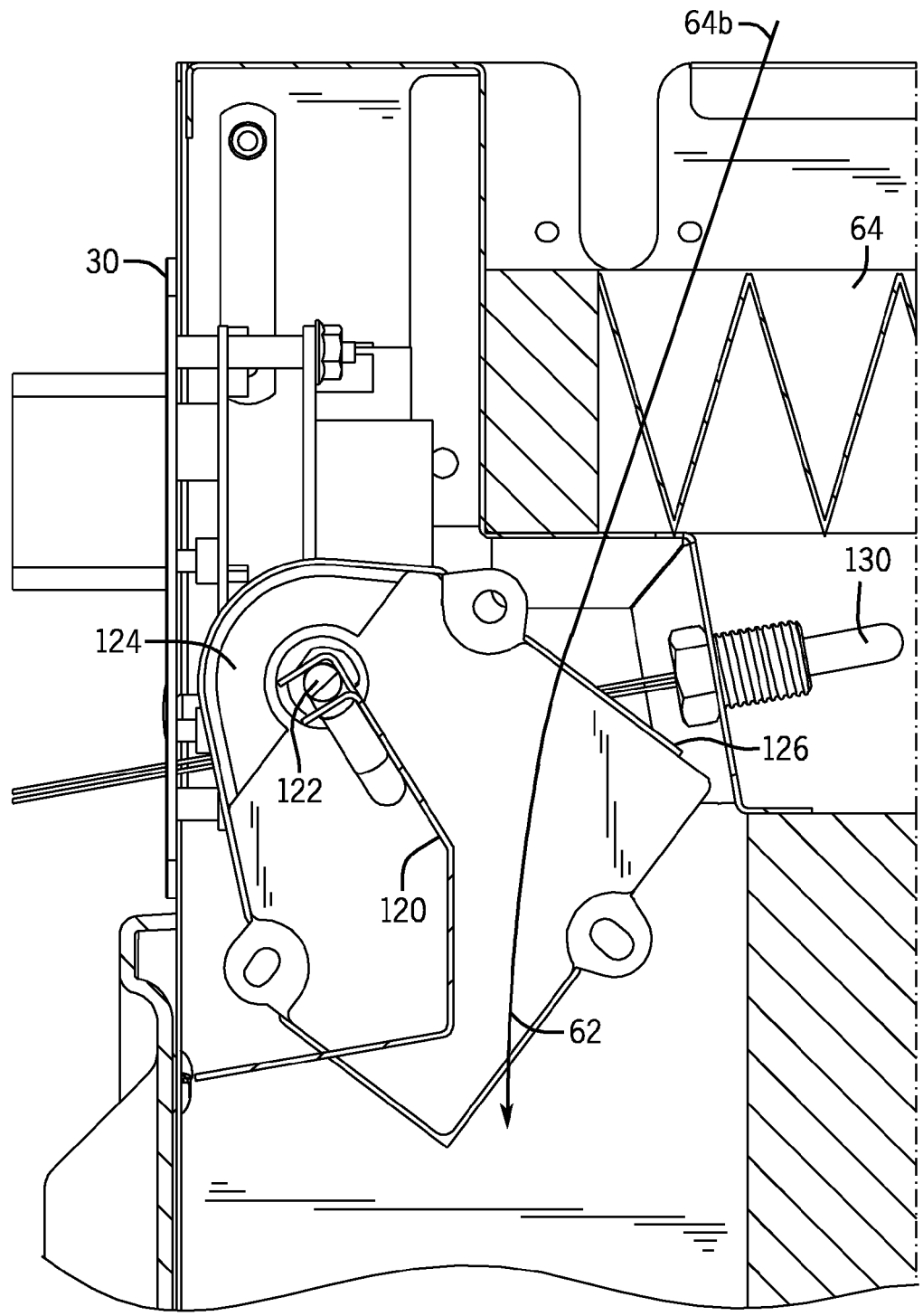
Figure 23:
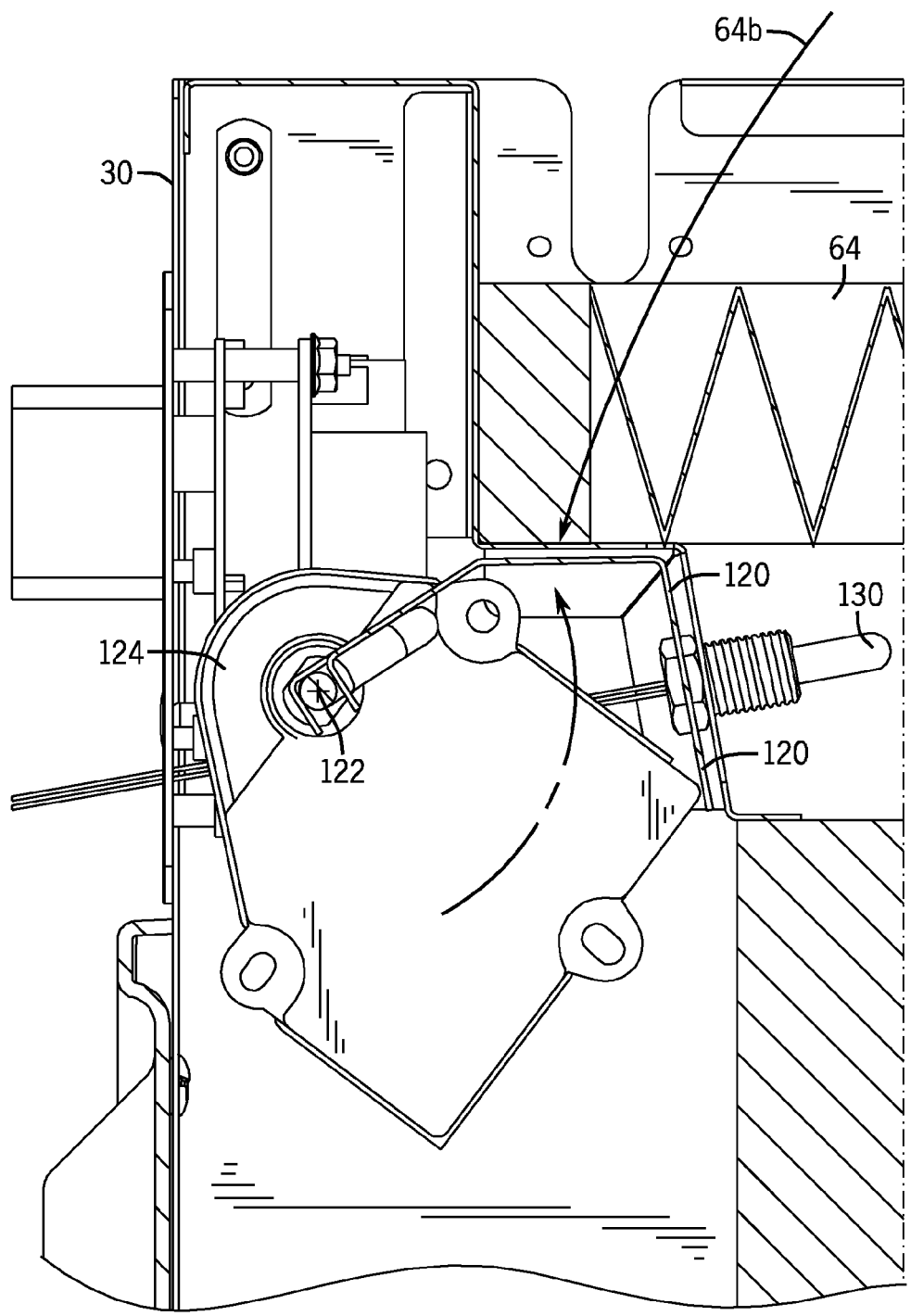
Figure 24:
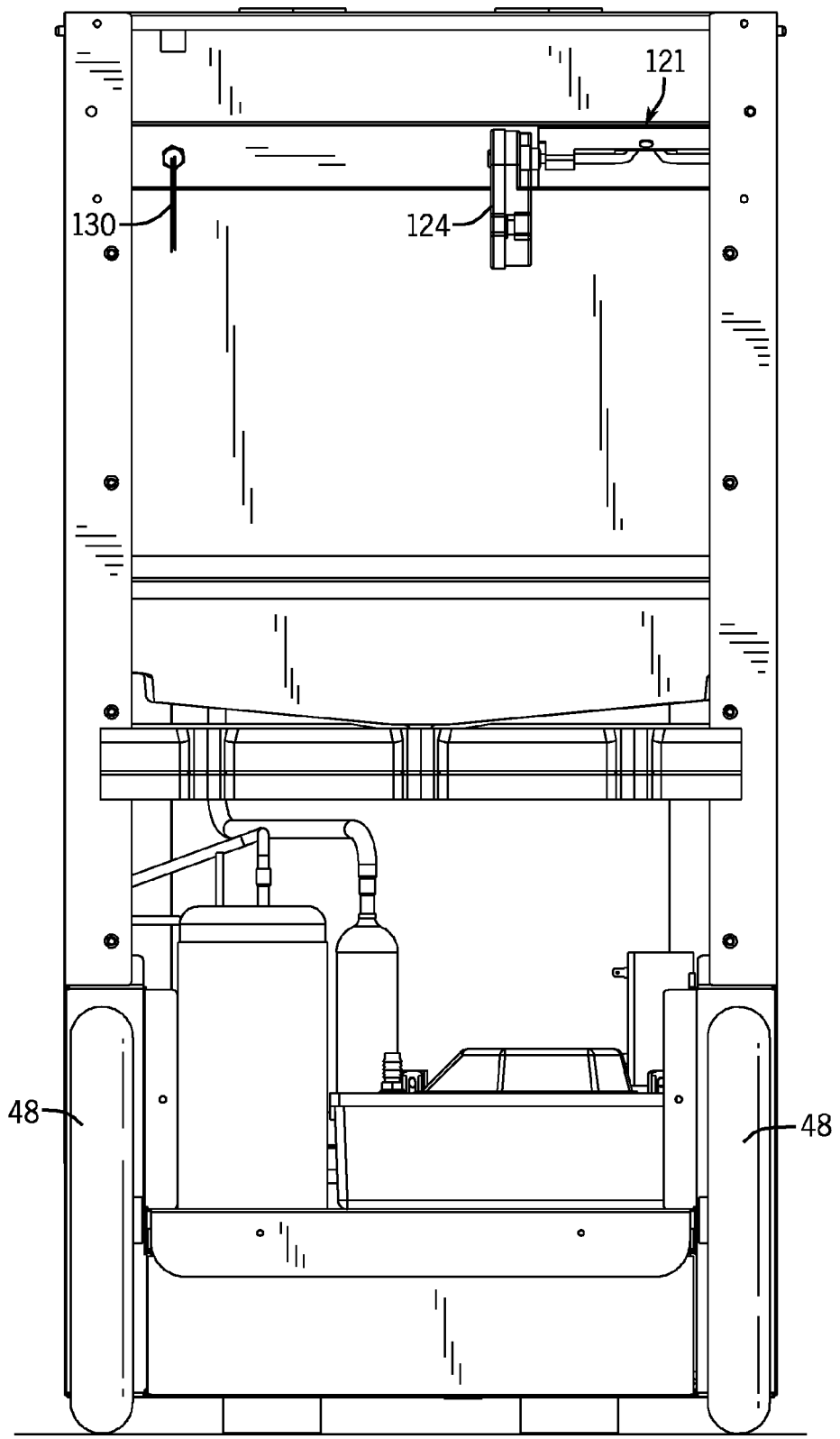
Figure 25:
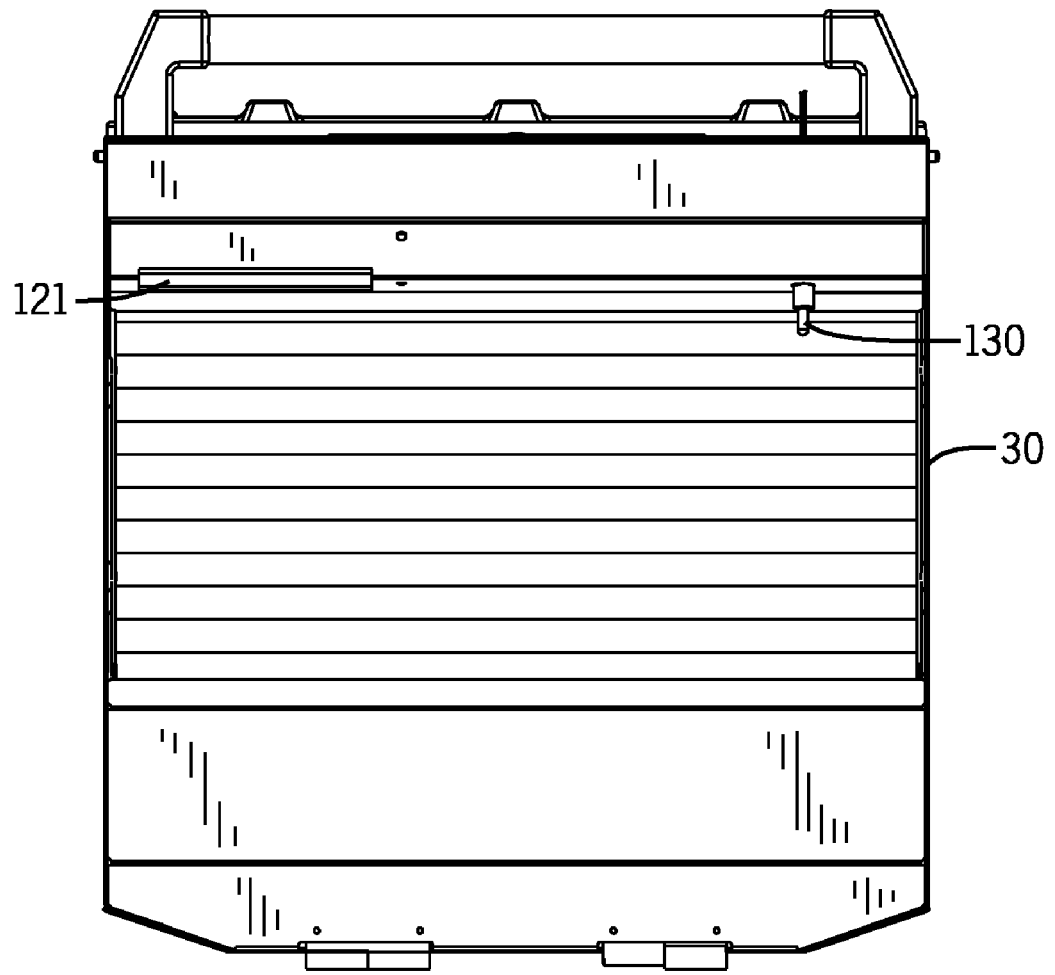
Figure 27:
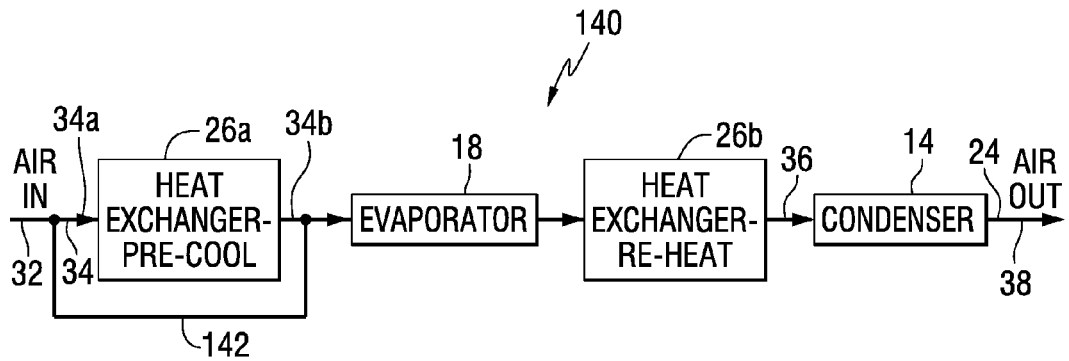
Figure 28:
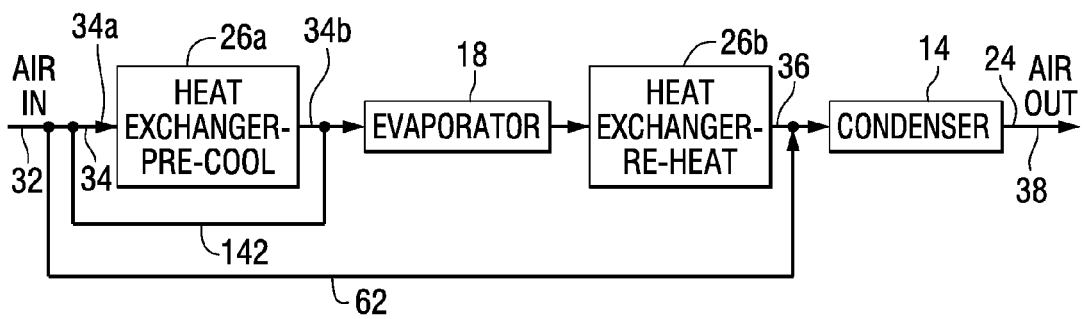
Figure 29:
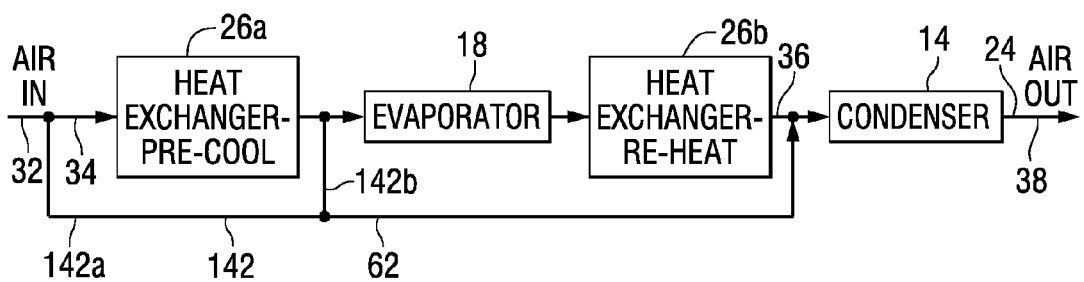
Figure 30:
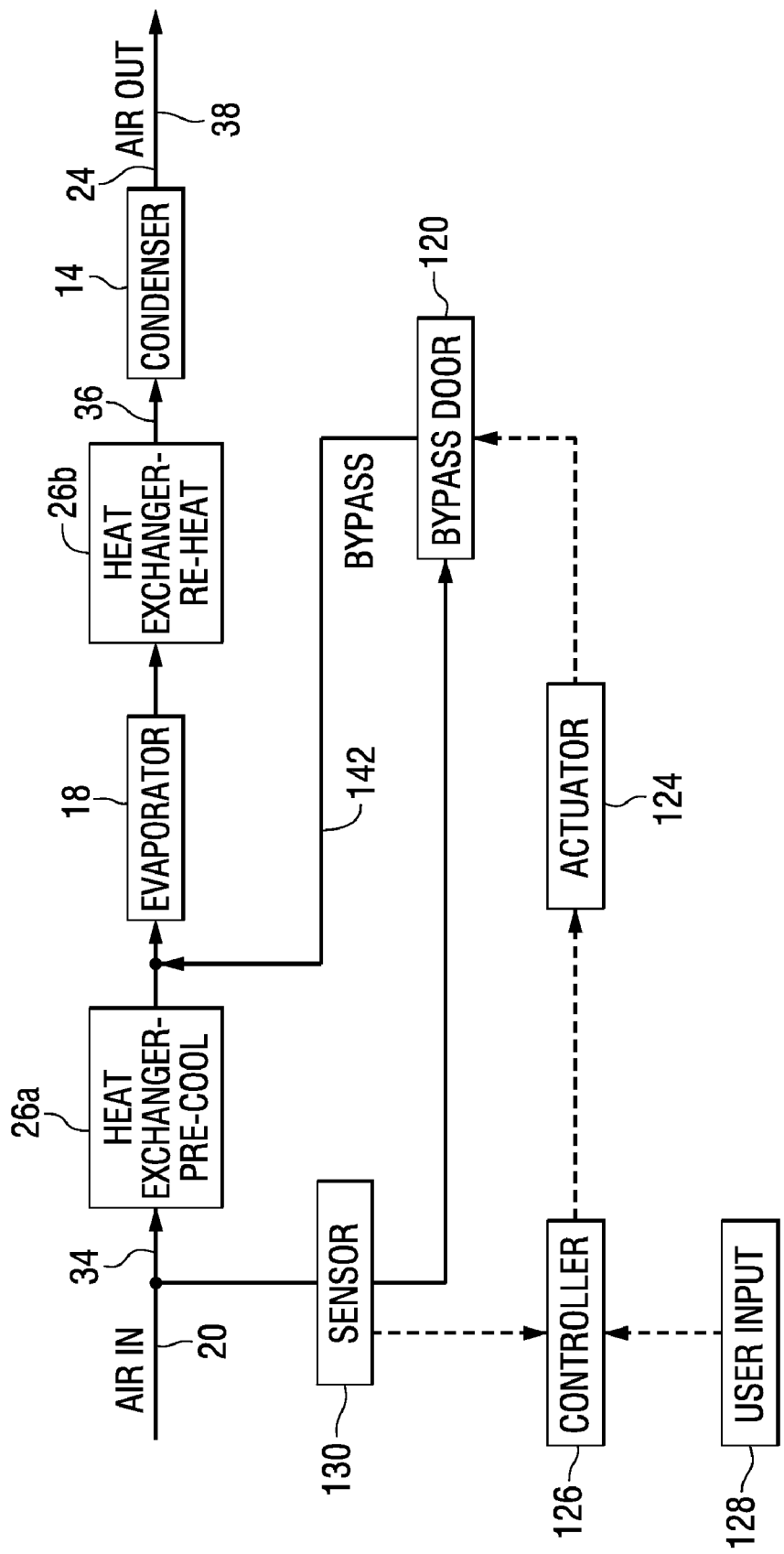
Figure 31:
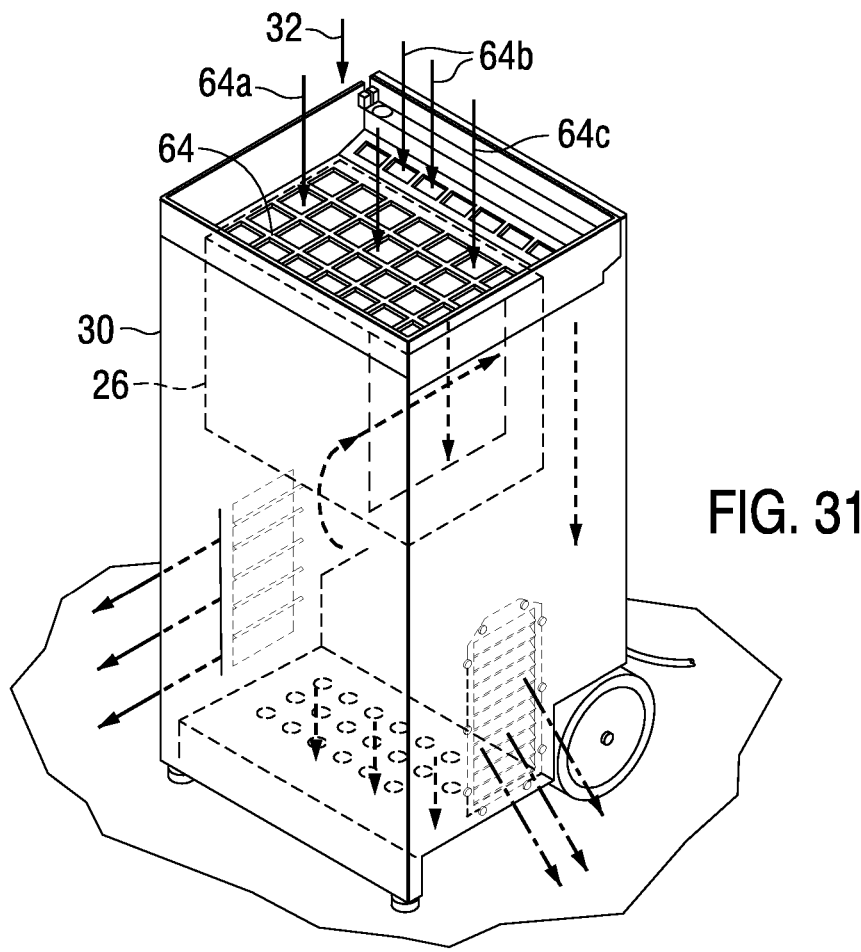
Figure 32:
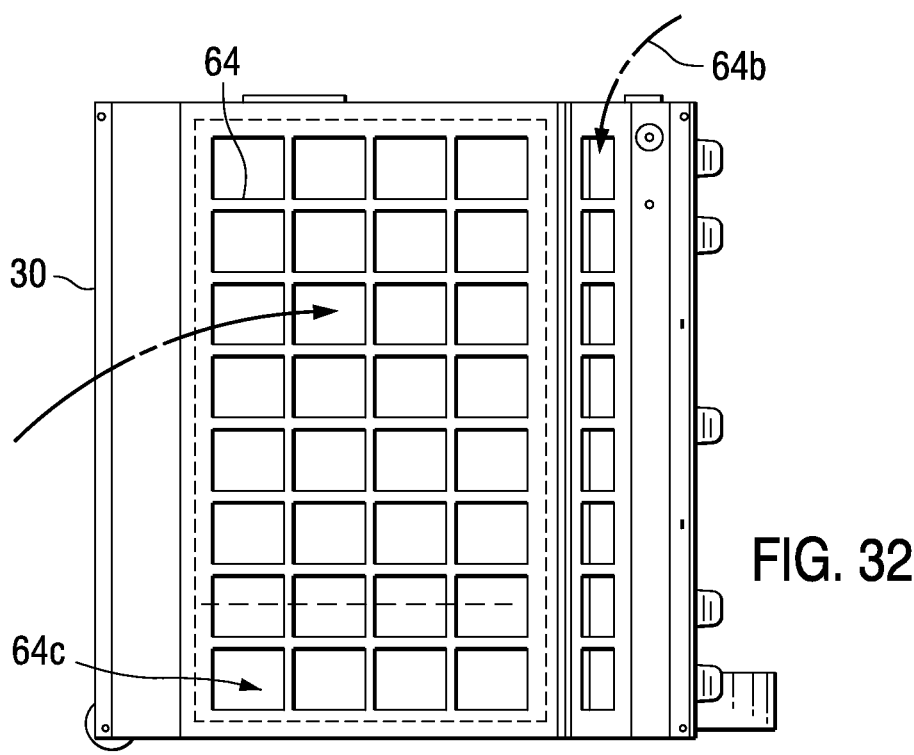
Figure 33:
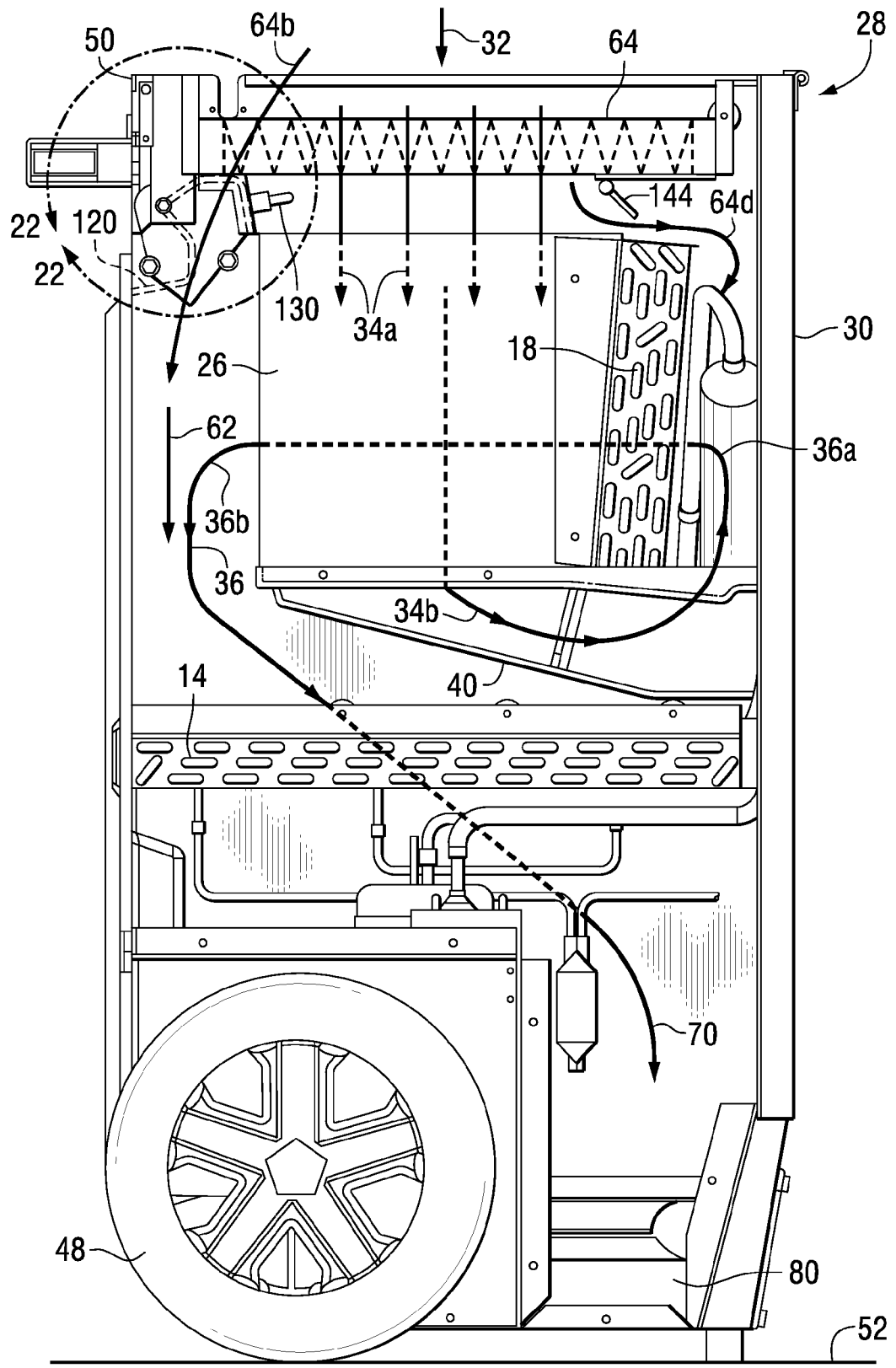

FIG. 27 is like FIG. 10 and shows the present invention.
FIG. 28 is like FIG. 27 and shows a further embodiment.
FIG. 29 is like FIG. 28 and shows a further embodiment.
FIG. 30 is like FIG. 20 and shows the present invention.
FIG. 31 is like FIG. 6 and shows the present invention.
FIG. 32 is like FIG. 7 and shows the present invention.
FIG. 33 is like FIG. 21 and shows the present invention.

DETAILED DESCRIPTION

Parent U.S. patent application Ser. No. 12/473,874

The following description is taken from the noted parent '874 application.

Figure 1:
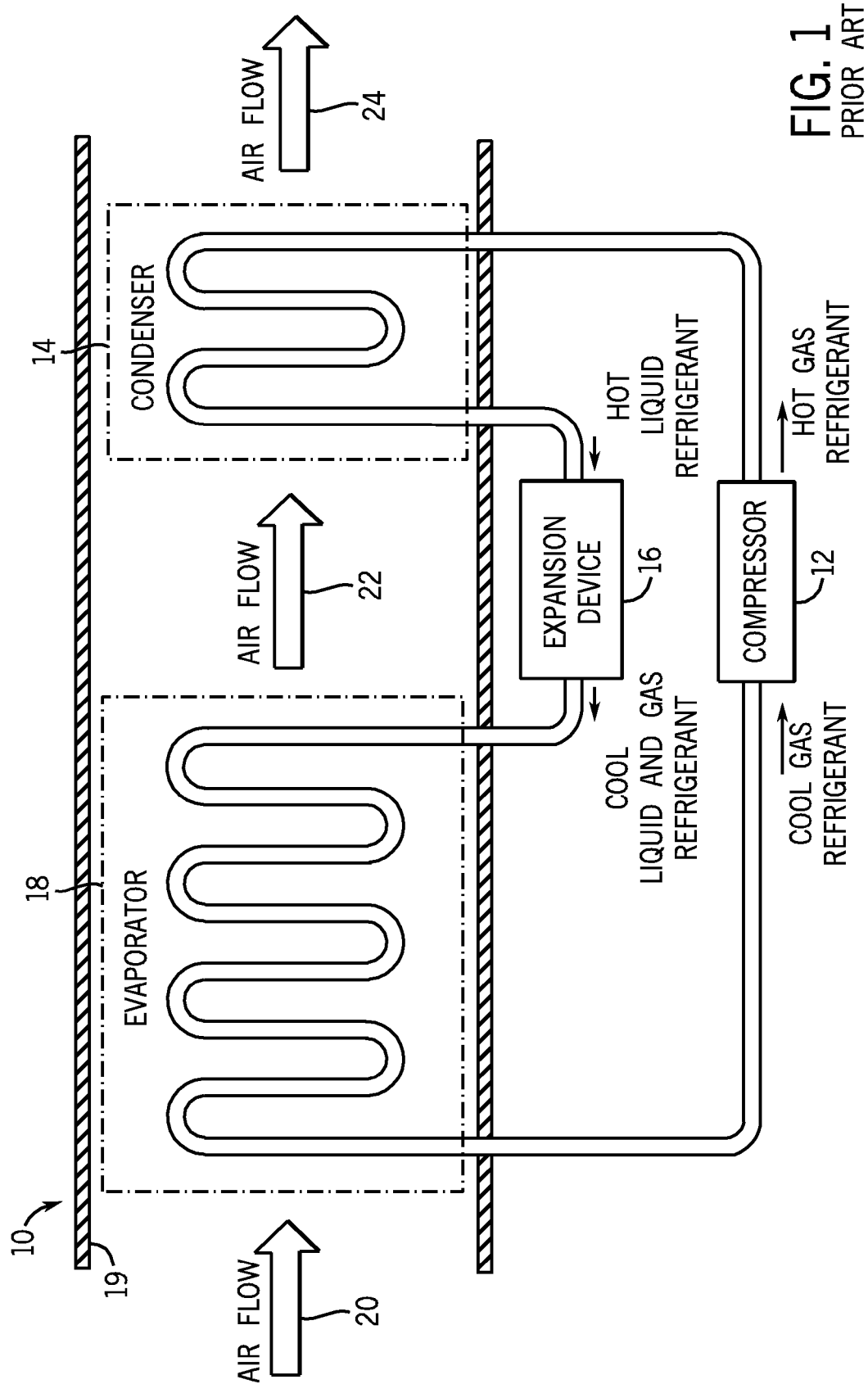
FIGS. 1-26 are taken from the noted parent '874 application.

FIG. 1 shows a dehumidifier 10 known in the prior art. A compressor 12 delivers compressed hot gas refrigerant. A condenser 14 receives the hot gas refrigerant and condenses same to hot liquid refrigerant, and gives up heat to the air flow therethrough. An expansion device 16 receives the hot liquid refrigerant and expands same to a liquid and gas refrigerant mixture of reduced temperature and pressure. Expansion device 16 is typically a flow restrictor, capillary tube, or other pressure reducer. An evaporator 18 receives the cool liquid and gas refrigerant mixture and evaporates the liquid portion to cool gas refrigerant, and absorbs heat from the air flow therethrough. The refrigerant is circulated from compressor 12 to condenser 14 to expansion device 16 to evaporator 18 and back to compressor 12 in a refrigeration cycle. Air flow, typically driven by a fan (not shown), is directed by a duct or housing 19 along a path through evaporator 18 and condenser 14. As the air flows through evaporator 18 from point 20 to point 22, the temperature of the air drops below the dew point such that water vapor in the air is condensed to liquid to dehumidify the air. The air is heated as it flows through condenser 14 from point 22 to point 24, and the warmed and dehumidified air is discharged to the desired space, such as a basement, or other interior space of a house or building.

Figure 2:
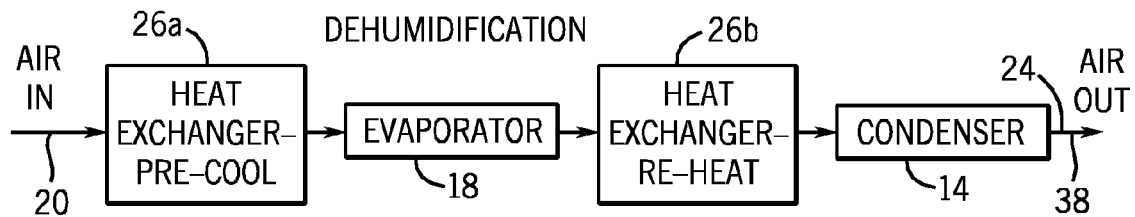
Figure 3:
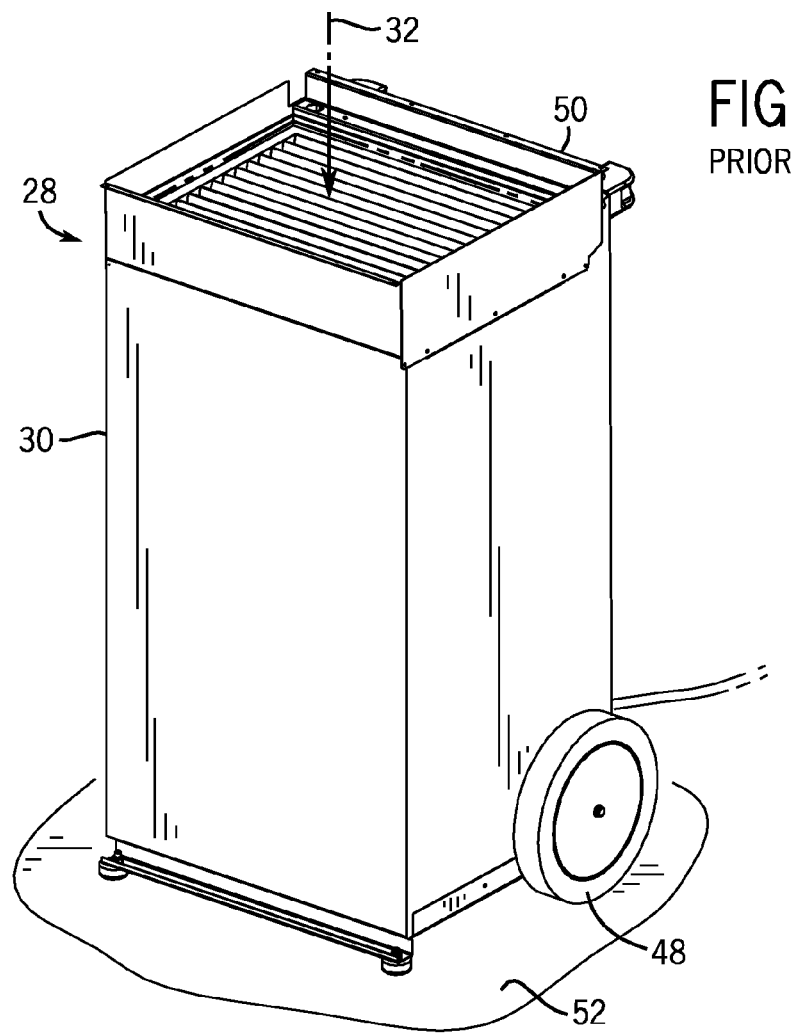
Figure 4:
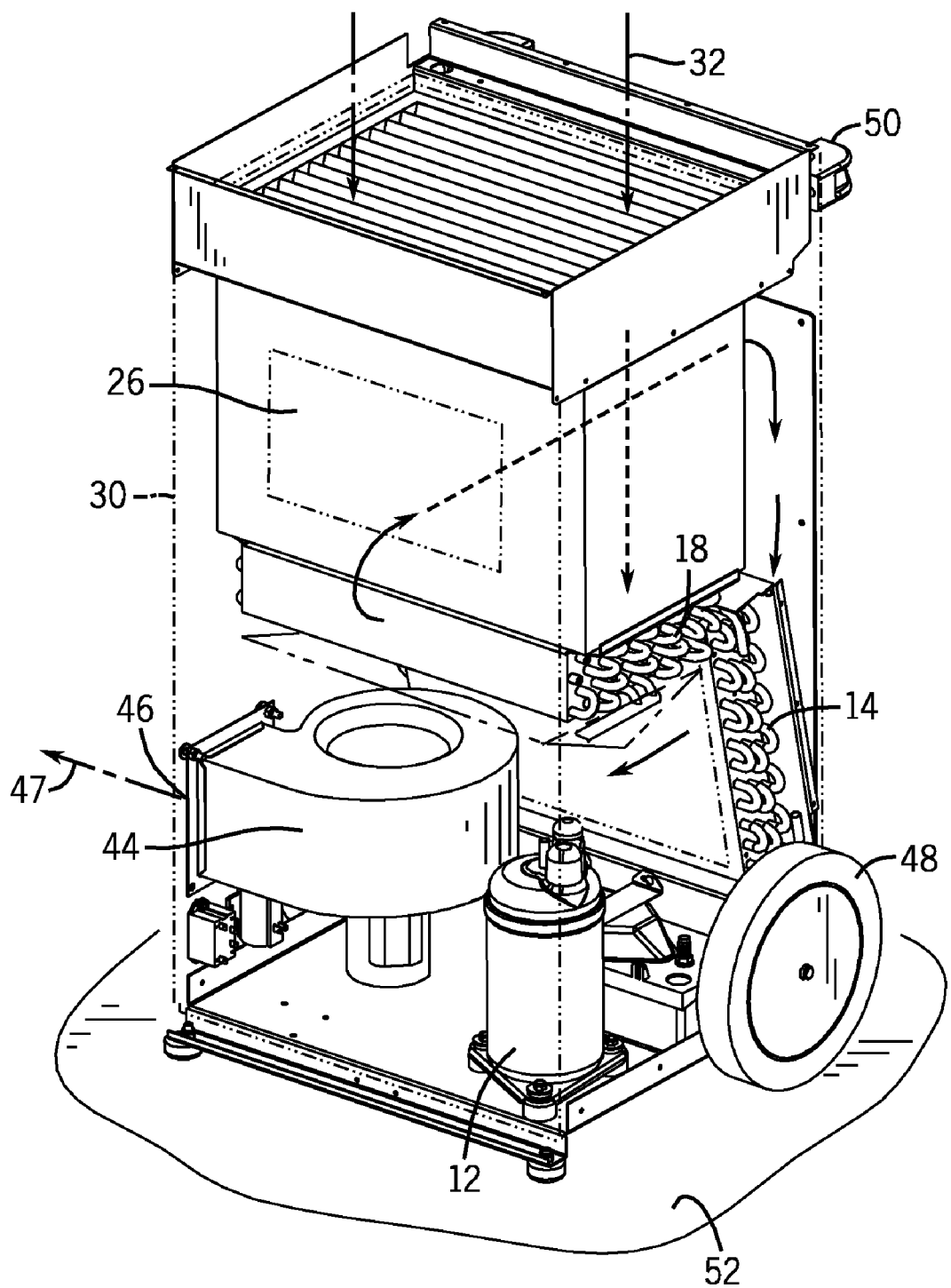
Figure 5:
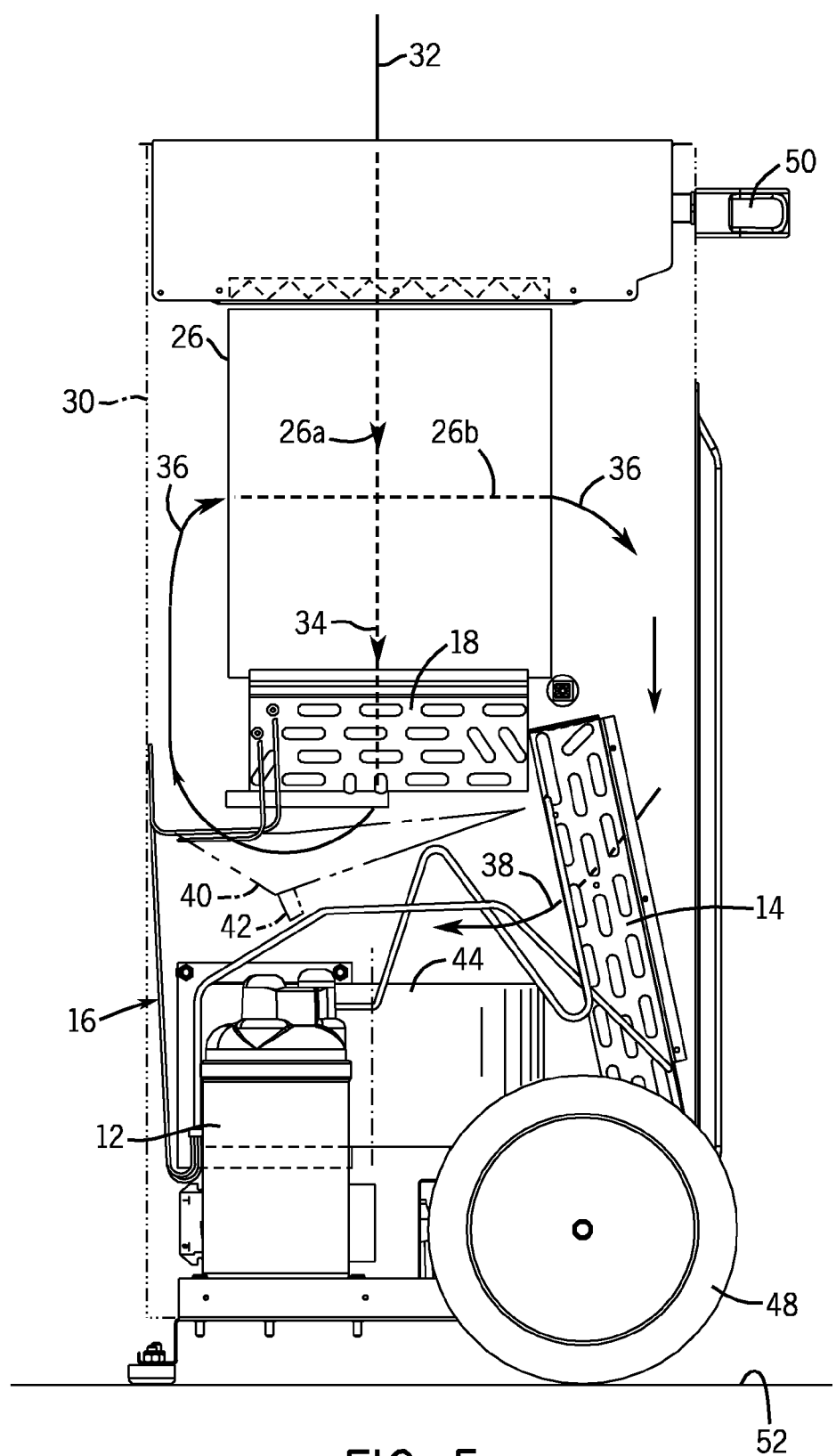

FIG. 2 further schematically illustrates the dehumidification of system of FIG. 1 and uses like reference numerals where appropriate to facilitate understanding. It is known to provide a heat exchanger 26a, 26b for pre-cooling the air upstream of evaporator 18 and then re-heating the air downstream of the evaporator. FIGS. 3-5 show a dehumidifier 28 including a portable cabinet 30, compressor 12 in the cabinet for delivering hot compressed refrigerant, condenser coil 14 in the cabinet and receiving refrigerant from compressor 12 and condensing same, capillary tube expansion device 16 in the cabinet and receiving refrigerant from condenser coil 14 and expanding same, and evaporator coil 18 in the cabinet and receiving refrigerant from expansion device 16 and evaporating same, and delivering the refrigerant to compressor 12. The refrigerant is circulated from compressor 12 to condenser coil 14 to expansion device 16 to evaporator coil 18 and back to compressor 12 in a refrigeration cycle, as is known. Cabinet 30 has an air flow path 32 therethrough, including a first segment 34, FIG. 5, passing ambient air to evaporator coil 18, a second segment 36 passing air from evaporator coil 18 to condenser coil 14, and a third segment 38 discharging air from condenser coil 14. The first, second and third segments, 34, 36 and 38, are in series from upstream to downstream, respectively. Heat exchanger 26 has first and second heat exchange paths 26a and 26b therethrough in heat exchange relation, for example provided by a plurality of layered corrugated sheets providing vertical air flow channels therethrough at 26a in heat exchange relation with a plurality of interdigitated corrugated layered sheets providing horizontal flow channels therethrough at 26b, providing an air-to-air cross flow heat exchanger as is known. Heat exchanger path 26a provides pre-cooled ambient air from which moisture is removed by evaporator coil 18. The removed moisture is collected at collection pan 40 having drainage outlet 42. The air is re-heated at heat exchanger flow path 26b, and the warm dry air is supplied to condenser coil 14 as pulled therethrough by squirrel cage blower 44 which discharges the dehumidified air at outlet 46 as shown at arrow 47. Portable cabinet 30 may be mounted on wheels such as 48 and have a handle such as 50 for maneuvering the cabinet and rolling it along a floor such as 52.

FIGS. 6-19 use like reference numerals from above where appropriate to facilitate understanding.

Figure 8:
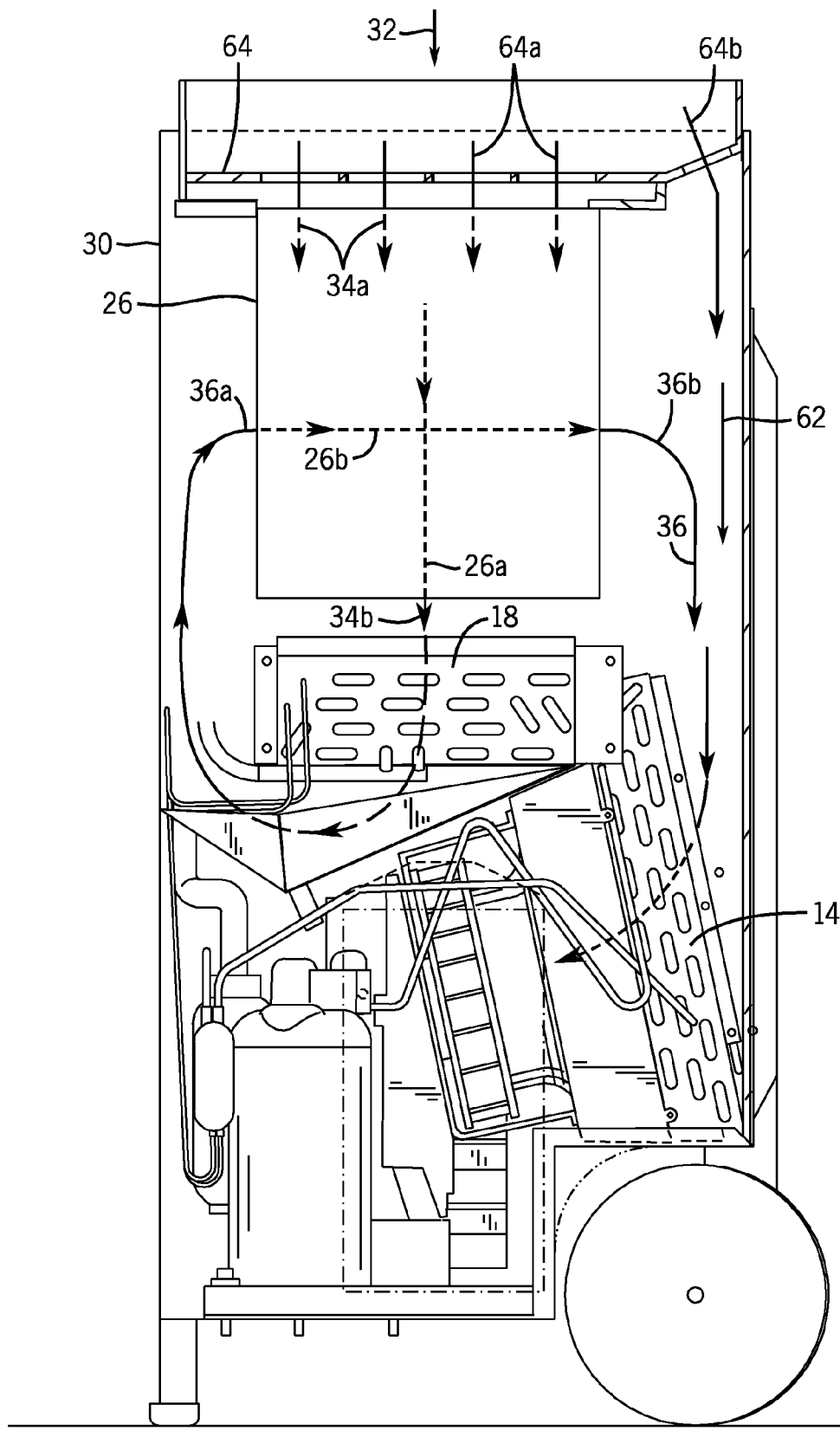
Figure 9:
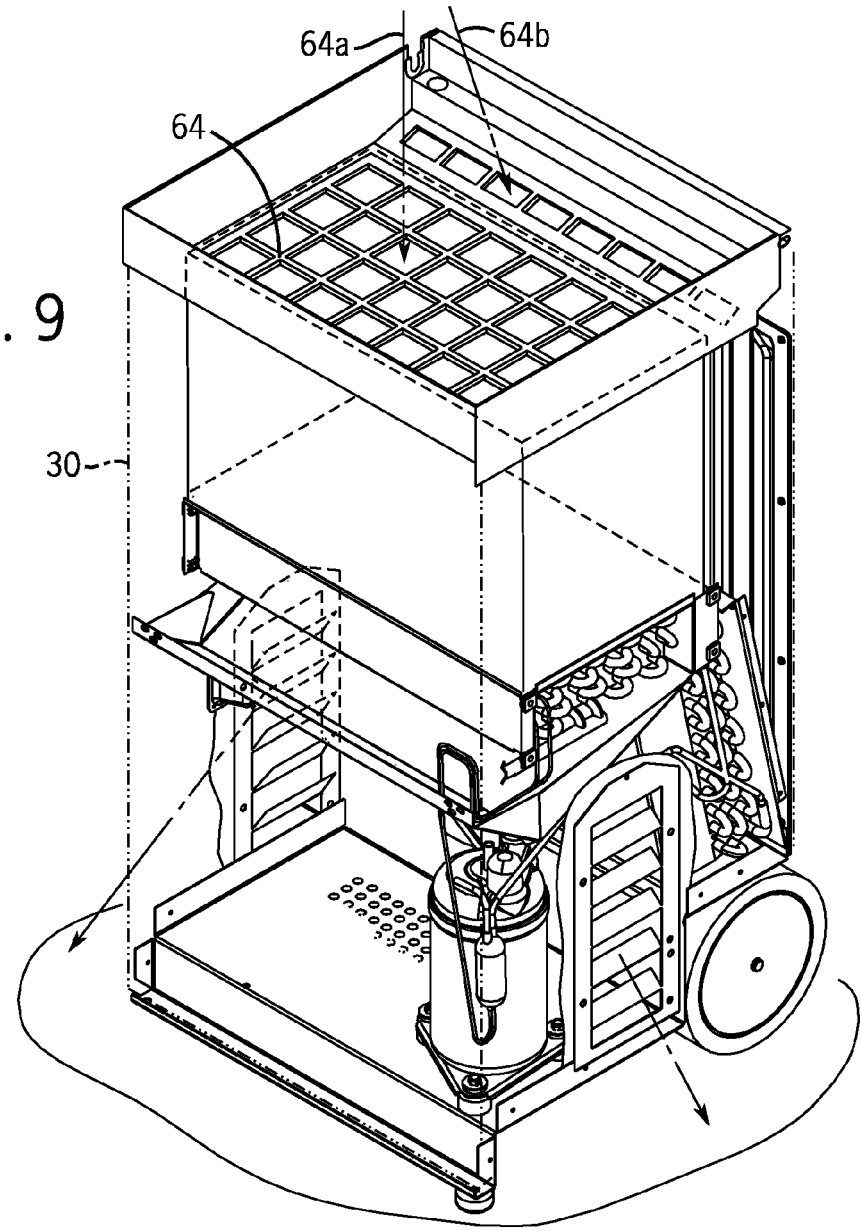

In FIGS. 6-10, the air flow path has a fourth segment 62, FIG. 8, passing ambient air to condenser coil 14. Fourth segment 62 is in parallel with second segment 36 of the air flow path. First segment 34 of the air flow path has a first subsegment 34a supplying ambient air to first heat exchange path 26a of the heat exchanger, and has a second subsegment 34b supplying air from first heat exchange path 26a of the heat exchanger to evaporator coil 18. Second segment 36 of the air flow path has a third subsegment 36a supplying air from evaporator coil 18 to second heat exchange path 26b of the heat exchanger, and a fourth subsegment 36b supplying air from second heat exchange path 26b of the heat exchanger to condenser coil 14. Fourth segment 62 is in parallel with fourth subsegment 36b. Segment 62 of the air flow path merges with subsegment 36b of the air flow path downstream of second heat exchange path 26b of heat exchanger 26. Fourth segment 62 of the air flow path is in parallel with each of the noted first and fourth subsegments 34a and 36b of the air flow path. Cabinet 30 has an inlet at grate 64 receiving ambient air at 32 and having first and second branches 64a and 64b. First branch 64a provides the noted first segment 34 of the air flow path. Second branch 64b provides the noted fourth segment 62 of the air flow path. Fourth segment 62 of the air flow path bypasses evaporator coil 18, and preferably bypasses both heat exchanger 26 and evaporator coil 18. Fourth segment 62 of the air flow path merges with second segment 36 upstream of condenser coil 14. The arrangement enhances high temperature performance of the dehumidifier. More moisture is removed over a standard dehumidifier under high ambient temperature conditions. The noted parent dehumidifier operation envelope is increased by bypassing a percentage of incoming ambient air around the evaporator and across the condenser. This extra air mixes with the air from the air-to-air cross flow heat exchanger 26 and lowers the condensing temperature. A lower condensing temperature extends the operation range using the same capacity compressor, evaporator and condenser coils.

Figure 11:
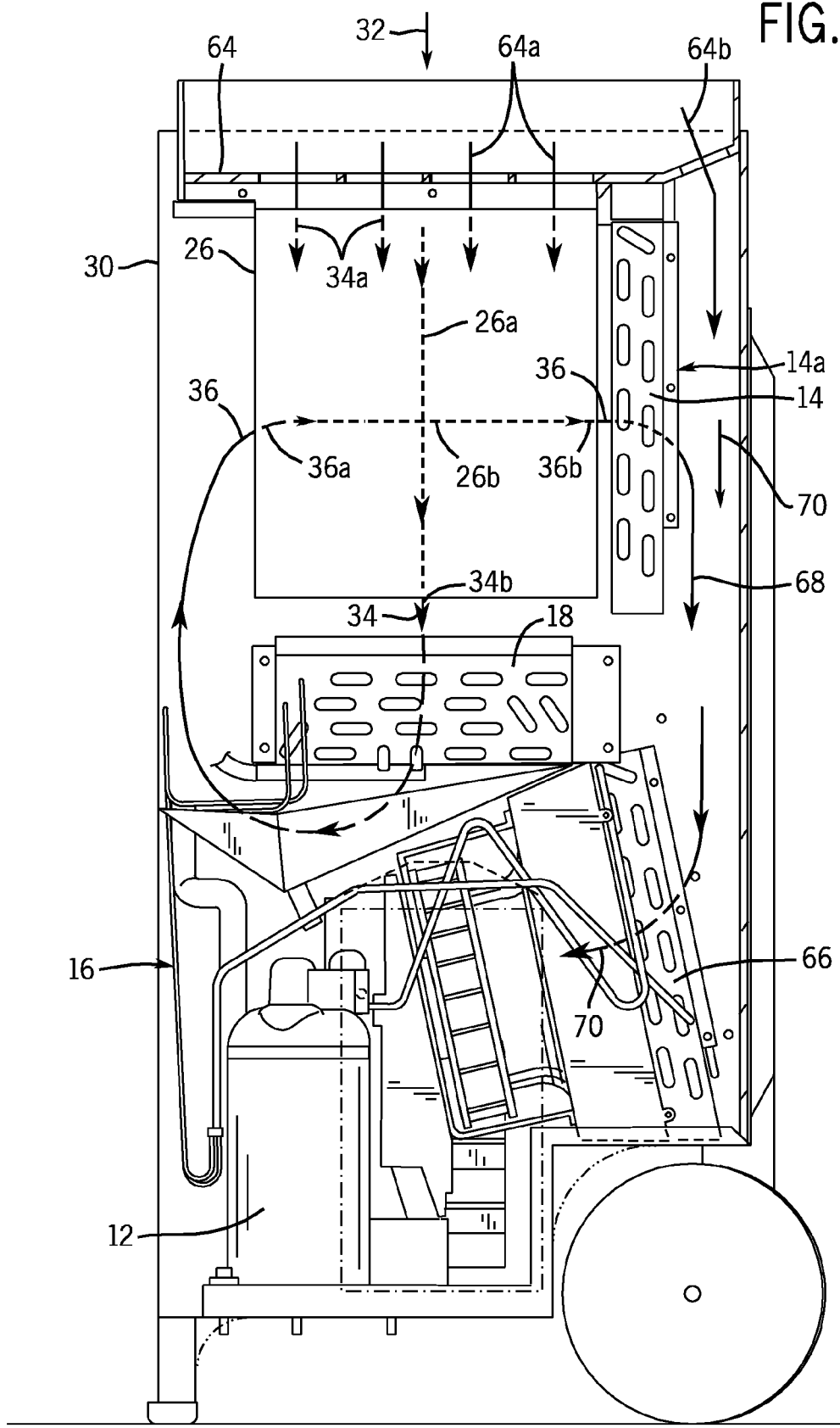
Figure 12:
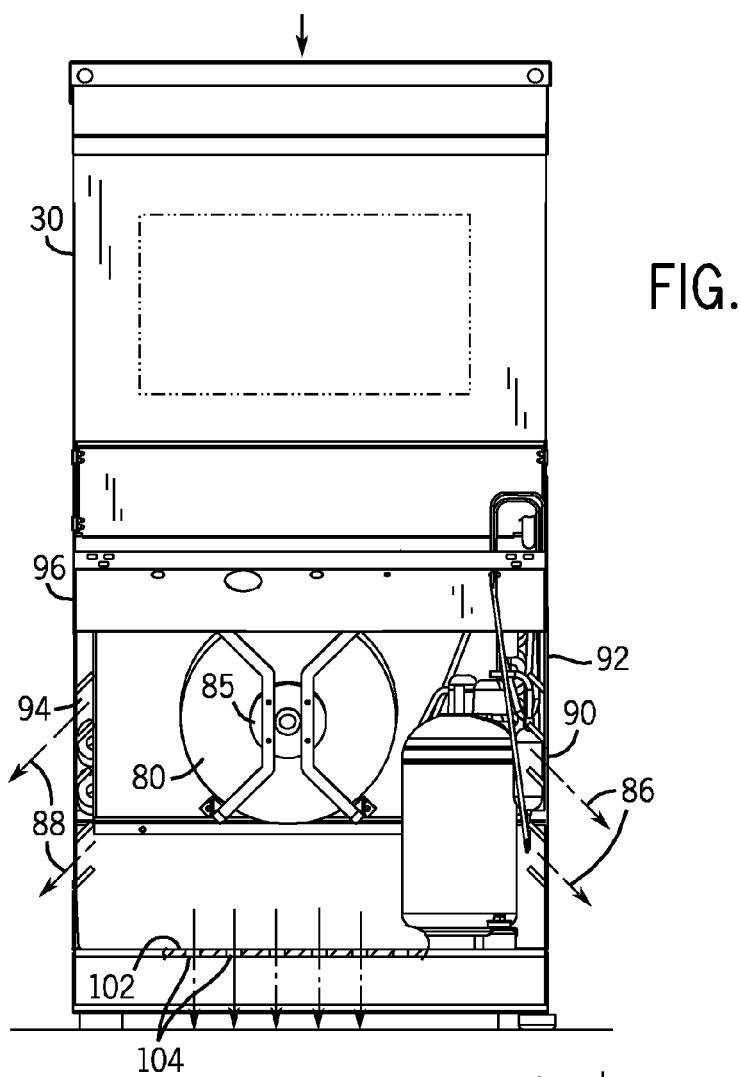

In FIG. 11, a desuperheater coil 66 is provided in cabinet 30 and receives refrigerant from compressor 12 and condenses same, and condenser coil 14 is moved to location 14a and receives refrigerant from desuperheater coil 66 and condenses same and supplies the refrigerant to the expansion device as above. Refrigerant is circulated from compressor 12 to desuperheater coil 66 to condenser coil 14 at location 14a to expansion device 16 to evaporator coil 18 and back to compressor 12 in a refrigeration cycle. First segment 34 of the air flow path passes ambient air to evaporator coil 18. Second segment 36 passes air from evaporator coil 18 to condenser coil 14. A third segment 68 passes air from condenser coil 14 at location 14a to desuperheater coil 66. A fourth segment 70 discharges air from desuperheater coil 66. The air flow path has a fifth segment 70 passing ambient air to desuperheater coil 66. First, second, third and fourth segments 34, 36, 68 and 70 of the air flow path in FIG. 11 are in series from upstream to downstream, respectively, and fifth segment 70 is in parallel with third segment 68. Heat exchanger 26 has the noted first and second heat exchange paths 26a and 26b therethrough. First segment 34 of the air flow path has the noted first subsegment 34a supplying ambient air to first heat exchange path 26a of the heat exchanger, and second subsegment 34b supplying air from first heat exchange path 26a of the heat exchanger to evaporator coil 18. Second segment 36 of the air flow path has the noted third subsegment 36a supplying air from evaporator coil 18 to second heat exchange path 26b of the heat exchanger, and fourth subsegment 36b supplying air from second heat exchange path 26b of the heat exchanger to condenser coil 14 at location 14a. Fifth segment 70 of the air flow path is in parallel with the noted fourth subsegment 36b after the latter passes through the condenser coil. Fifth segment 70 of the air flow path merges with third segment 68 of the air flow path downstream of condenser coil 14 and upstream of desuperheater coil 66. Fifth segment 70 is in parallel with the noted first subsegment 34a.

Cabinet 30 in FIG. 11 has the noted inlet at grate 64 receiving ambient air at 32 and having the noted first and second branches 64a and 64b. First branch 64a provides first segment 34 of the air flow path. Second branch 64b provides the noted fifth segment 70 of the air flow path. Fifth segment 70 bypasses each of heat exchanger 26 and evaporator coil 18 and condenser coil 14. The arrangement removes more moisture than a standard dehumidifier under high ambient temperature conditions. The dehumidifier operation envelope is increased by bypassing a percentage of incoming ambient air around the evaporator and across the desuperheater coil. This extra air mixes with the air from the condensing coil at location 14a and lowers the condensing temperature. The combination of desuperheater coil 66 and condenser coil 14 at location 14a captures the lower temperature air for condensing and the higher temperature mixed air for removing the superheat. This provides even greater efficiency than the arrangement of FIGS. 6-10. For example, the vapor temperature exiting the compressor 12 may typically be 140 to 150° F., but the condensing temperature may be about 120° F. This extra 30° F. of superheat is utilized by directing the bypass air at 70 across the desuperheater coil 66, which bypass air was not pre-cooled as is the air flow at 34. Separate coils may be used at 66 and 14a, or alternatively different sections of one coil may be used.

In FIGS. 12-19, squirrel cage blower 44 of FIG. 4 is replaced by an impeller 80 in cabinet 30 downstream of condenser coil 14 and drawing air through the cabinet from upstream to downstream, namely through the noted first, second and third segments 34, 36, 38 of the air flow path in FIGS. 6-10, respectively, and any further air flow path segments such as in FIG. 11. Impeller 80 is preferably a backward incline blade impeller, sometimes called a backward curved impeller, as readily commercially available, for example from Soler & Palau, Inc., 16 Chapin Road, Unit #903, P.O. Box 637, Pine Brook, N.J. 07058.

Figure 13:
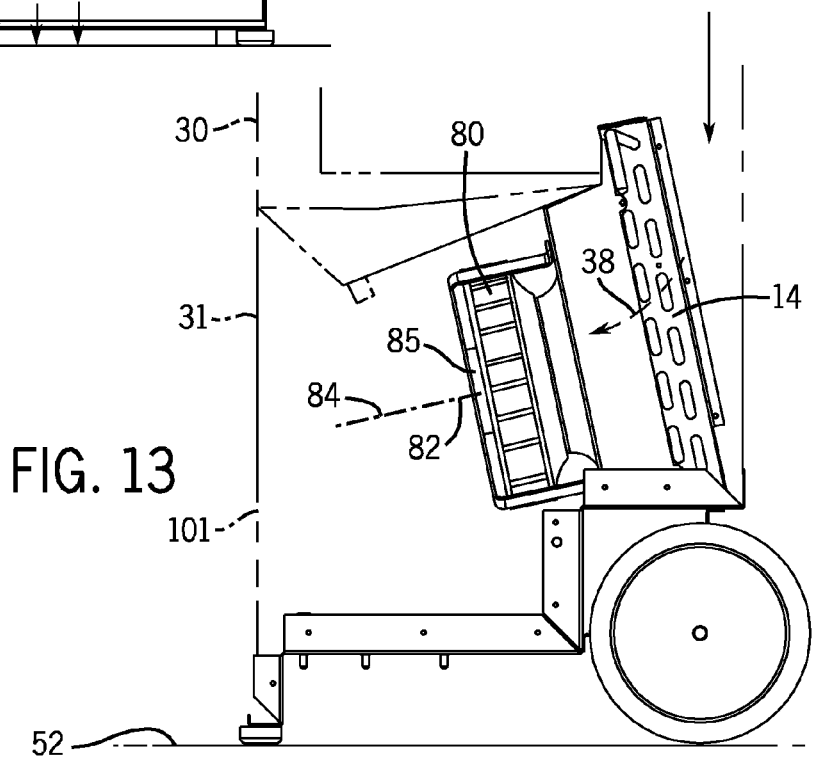
Figure 14:
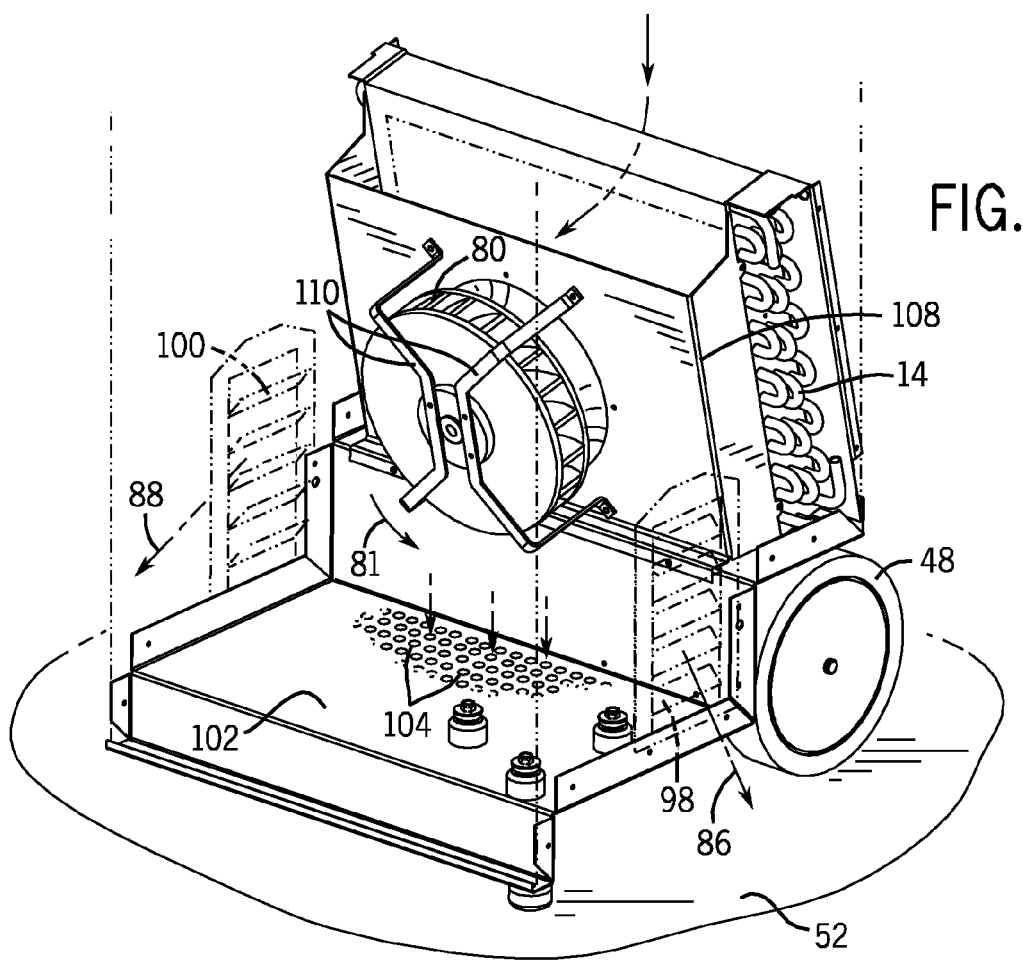
Figure 15:
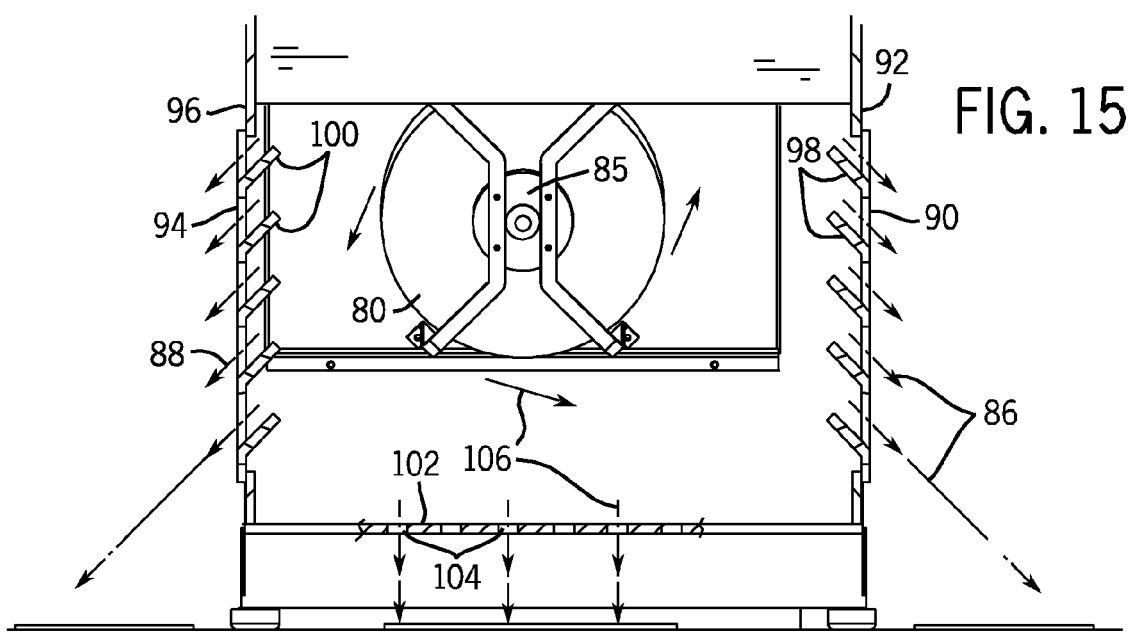
Figure 16:
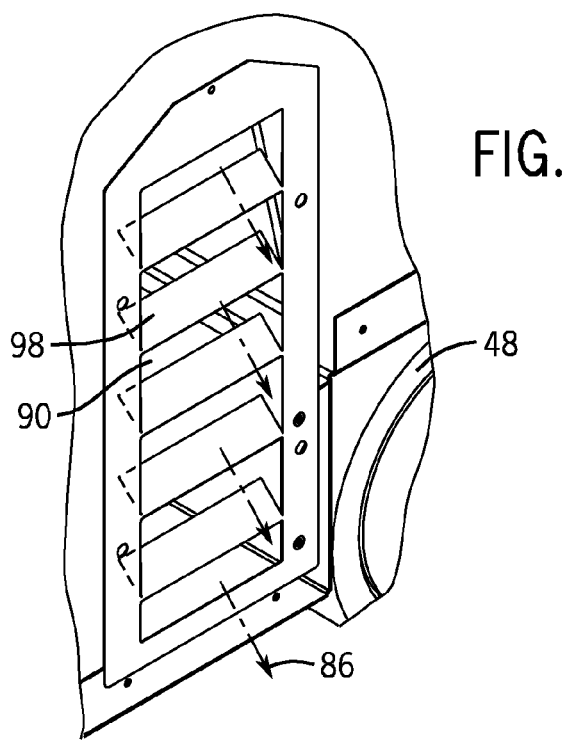
Figure 19:
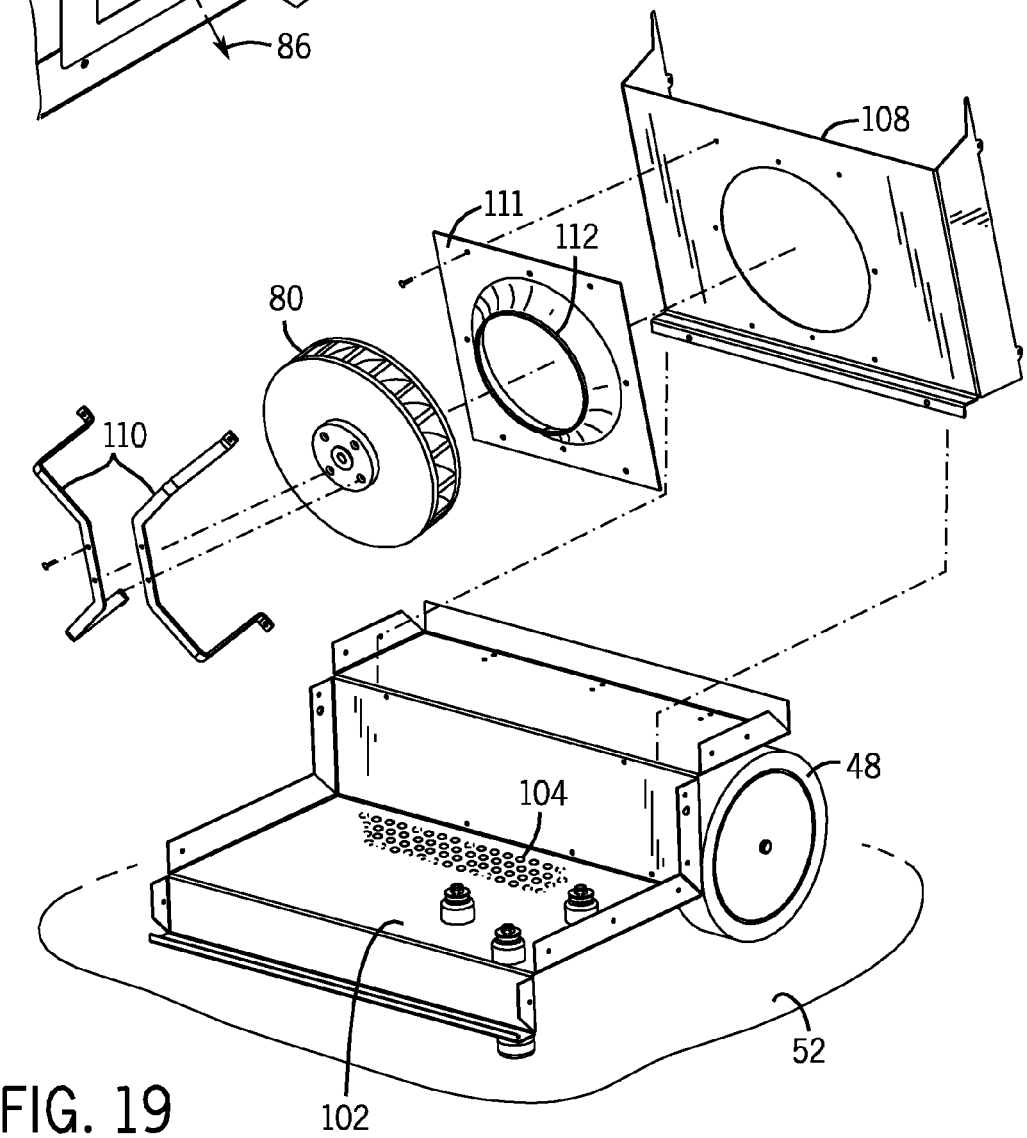
Figure 17:
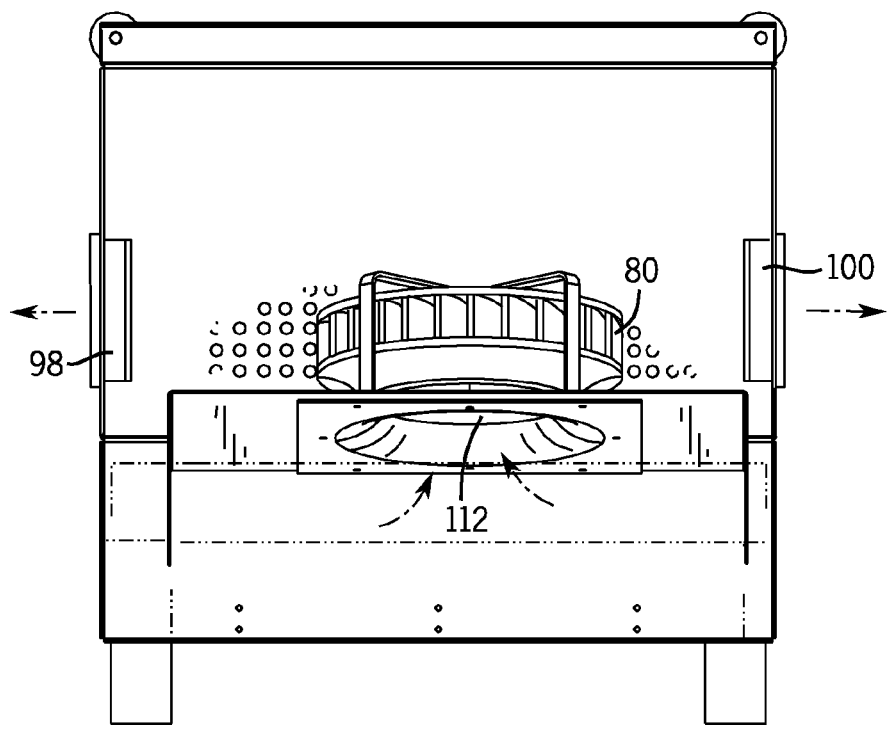
Figure 18:
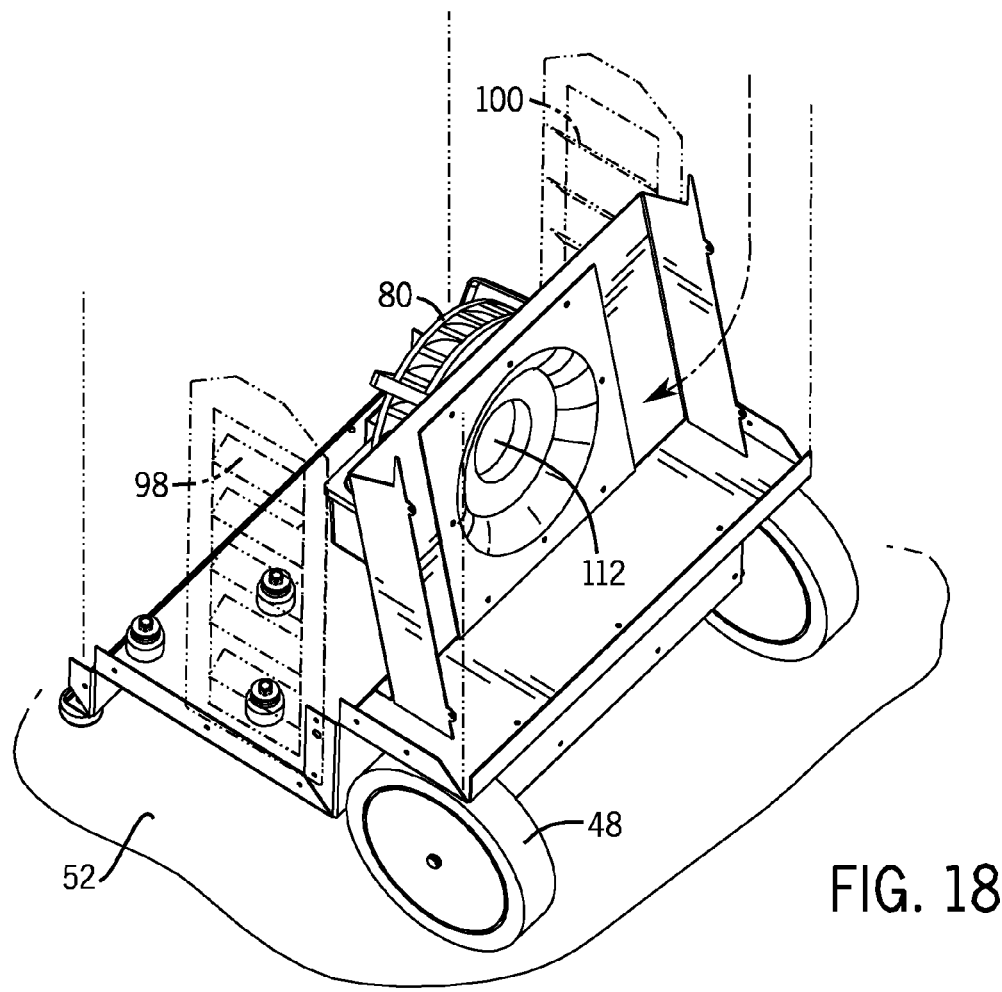

Impeller 80 rotates about a rotation axis 82, FIG. 13, extending along an axial direction 84 and driven by a motor 85, as is known. As viewed in FIG. 14, impeller 80 rotates counterclockwise, as shown at rotational directional arrow 81. Third segment 38 of the air flow path extends axially along axial direction 84. The air flow path has a further segment 86, and preferably distally opposite segments 86 and 88, FIGS. 14, 15, discharging air from the impeller. Segments 86, 88 extend radially along respective radial directions relative to axial direction 84. Cabinet 30 has an air flow outlet provided by one or more openings 90 in a cabinet sidewall 92 distally oppositely spaced from impeller 80 along the noted radial direction, and has a second air flow outlet provided by one or more openings 94 in cabinet sidewall 96 distally oppositely spaced in the other direction from impeller 80 along the noted radial direction. Cabinet 30 is portable, as above noted, including along a floor such as 52. One or more deflectors 98, FIG. 15, direct exiting air downwardly through openings 90 in cabinet sidewall 92 towards floor 52 exteriorly of cabinet 30 to dry floor 52, such that the dehumidifier is also a water-damage-restoration drying fan. A second set of one or more deflectors 100 direct exiting air downwardly through openings 94 in cabinet sidewall 96 towards floor 52 exteriorly of cabinet 30 to dry floor 52. The respective cabinet sidewall has one or more louvers extending thereacross and angled downwardly to provide the noted sets of deflectors 98, 100. In further embodiments one or more openings 101 may be provided in cabinet front wall 31 along axial direction 84, providing an air flow outlet therethrough.

Cabinet 30 has a bottom wall 102 with one or more openings 104 therein. The air flow path has a segment 106 passing air from impeller 80 through the one or more openings 104 in bottom wall 102. The dehumidifier thus has plural air flow outlets, including the air flow outlet along segment 86 through opening 90 in cabinet sidewall 92, the air flow outlet along segment 88 through opening 94 in cabinet sidewall 96, and the air flow outlet along segment 106 through opening 104 in bottom wall 102 of the cabinet. The cabinet includes a plenum wall 108 between condenser coil 14 and impeller 80 and mounting the latter thereto at a pair of brackets 110 and having a shroud 111 with an opening 112 therethrough for communicating air from coil 14 to impeller 80 which in turn creates a negative pressure chamber drawing air from upstream to downstream as above noted, through coil 14 and opening 112 for discharge at flow path segments 86, 88, 106. The arrangement provides improved water restoration dehumidification particularly along floor 52 including underneath the dehumidifier cabinet 30, eliminating moisture shadows underneath the unit and in turn alleviating the need for service personnel to return periodically, e.g. the following day, to relocate the unit to otherwise dry the noted shadow. The backward incline blade impeller improves space efficiency for mounting, air volume, and the amount of air flow per current draw over a centrifugal blower such as a squirrel cage blower at the same air flow conditions. The louvered exits direct the warm dry air downwardly toward the high moisture floor instead of merely allowing dissipation of exiting dry air to the surroundings. This directed air flow enables the dehumidifier to function as a fan (e.g. for water damage restoration) in addition to being a dehumidification device. Solution of the noted moisture shadow problem is optional, through desirable and readily achievable by directing warm dry air underneath the unit as noted.

FIGS. 20-26 use like reference numbers from above where appropriate to facilitate understanding.

FIGS. 20-25 depict a bypass door 120 that is selectively positionable to block air flow along the noted fourth segment 62 and alternately to allow air flow along the fourth segment 62. The bypass door 120 is movable between an open position (FIG. 22) to allow air flow along the fourth segment 62 and a closed position (FIG. 23) to block air flow along the fourth segment 62. In the example shown, the bypass door 120 includes an angled plate that is pivotally connected to a rotatable door rod 122 to open a bypass opening 121 in the open position (FIG. 22) and close the bypass opening 121 in the closed position. Other configurations of a bypass door could be employed to accomplish the functional objectives described herein.

The bypass door 120 can be moved between the noted open and closed positions manually or automatically by for example a mechanical or electro-mechanical actuator. In the example shown, an electro-mechanical actuator 124 including an electric motor is operatively coupled to the bypass door 120 via the door rod 122. Actuation of the actuator 124 causes rotation of the door rod 122 about its longitudinal axis P, which in turn causes the bypass door 120 to pivot (arrow A) about the axis P into and out of the noted open and closed positions. In the preferred example, the actuator 124 is a 12 VDC positional actuator, commercially produced and sold by Johnson Electric, North America.

Other types of actuators could be employed to accomplish the functional objectives described herein. For example, the actuator 124 could include a bimetallic disc or lever configured to move the bypass door 120 into a predetermined location. As the bimetallic disc springs from one location to another, the bypass door 120 would be driven, for example, into or out of the open or closed position. The disc/lever could be configured to actuate the door directly or to drive an electric motor to move the door. In another example, the bimetallic disc or lever could be configured to snap into position as it responds to a given air inlet ambient air temperature or evaporator outlet temperature. Alternatively, the bimetallic disc or lever could snap into position as it responds to a given dehumidifier refrigerant suction, discharge or liquid temperature.

In the example shown, a controller 126 is configured to selectively actuate the actuator 124 and to thereby selectively move the bypass door 120 between the noted open and closed positions. The controller 126 includes a programmable processor having a memory and an operating platform capable of receiving input data from a user input 128 and one or more sensors 130 and providing output data/instructions to control operation of the actuator 124. In the example shown, the controller 126 is housed in the dehumidifier 10 and communicatively coupled to the actuator 124, an optional user input device 128, and one or more sensors 130 by wired communication links. Alternately, the controller 126 can be located remotely from the dehumidifier and communicatively coupled to the actuator 124, an optional user input device 128, and one or more sensors 130 by a wireless link, including for example a LAN, WLAN, internet, intranet connection and/or the like. In the example shown, the communication links are capable of communicating real time data between the sensor 130 and the controller 126 and optionally the user input 128 and capable of providing real time output instructions to the actuator 124. In a preferred example, the controller 126 is a solid state programmable controller, commercially available from ITW/Arkles Corp. Other types of controllers could be employed to accomplish the functional objectives described herein.

In a preferred example, the controller is programmed with one or more algorithms (as described hereinbelow) to control movement of the bypass door 120 into and/or out of the noted open and closed positions, or to an alternate optimal door position, as described hereinbelow, based upon a parameter sensed by the sensor 130. Optionally, the system can include a user input device 128, which can include any type of user interface configured for input of control instructions to the controller 126. In one example, the user input device 128 includes a display panel have input buttons configured to receive user instructions pertaining to operation of the actuator 124 (i.e. instructions to move the bypass door 120 into or out of the noted open and closed positions, or to an alternate optimal door position, as described hereinbelow) and optionally a display screen for displaying a current operational state or parameter associated with the bypass door 120 and/or dehumidifier 10.

One or more sensors 130 are configured to sense an operational parameter of the dehumidifier 10 and to communicate the sensed parameter to the controller 126 via the noted communication link. In the example shown, the sensor 130 includes a thermistor attached to the dehumidifier 10 in a position to sense a condition of ambient air received at 32, such as the temperature of the ambient air or the relative humidity of the ambient air. A preferred sensor of this type is Therma-Stor PN 402858 made commercially by Arkless. Other types of sensors could be employed to accomplish the objectives described herein.

In use, the sensed parameter is communicated to the controller 126, which is configured to compare the parameter to a predetermined range of parameters stored in its memory. Based upon this comparison, the controller 126 actuates the actuator 124 when the controller 126 determines that the sensed parameter is inside or outside of the stored predetermined range. In a preferred example, the controller 126 can be configured such that if it determines that the ambient air temperature sensed by sensor 130 is less than 85 degrees Fahrenheit, it actuates the actuator 124 to close the bypass door 120. If the sensed ambient temperature is greater than 90 degrees Fahrenheit, the controller 126 actuates the actuator 124 to open the bypass door 120.

In another preferred example, the controller 126 is configured to identify an optimal bypass door position between the noted open and closed positions based upon a comparison of the sensed parameter to the predetermined range, and then to move the bypass door 120 to the optimal bypass door position. Thus the bypass opening 121 can be partially opened or closed by the bypass door 120. For example, ambient temperatures that are sensed to be within a range of 81 and 89 degrees Fahrenheit can result in the controller 126 rotating the bypass door 120 away from a mid position between open and closed positions, according to a look-up table stored in the memory of the controller 126, as follows:

| Sensor Temperature F. | Door Position Degrees |
|---|---|
| 81 | 40 clockwise (CW) |
| 82 | 28 CW |
| 83 | 15 CW |
| 84 | 2 CW |
| 85 | 14 counterclockwise (CCW) |
| 86 | 24 CW |
| 87 | 37 CCW |

-continued

| Sensor Temperature F. | Door Position Degrees |
|---|---|
| 88 | 40 CCW |
| 89 | 53 CCW |

In another example, the sensor 130 can be configured and positioned on the dehumidifier 10 to sense other operational parameters of the dehumidifier 10, upon which the controller 126 would actuate the actuator 124 and thus the bypass door 120. For example, the sensor 130 can be configured to sense refrigerant temperature, refrigerant suction pressure, and/or refrigerant discharge pressure. The controller 126 would then follow similar comparison logic to that provided above to position the bypass door 120 into and out of the closed position, or to another identified optimal door position if the sensed parameter is outside of a predetermined range.

Figure 26:
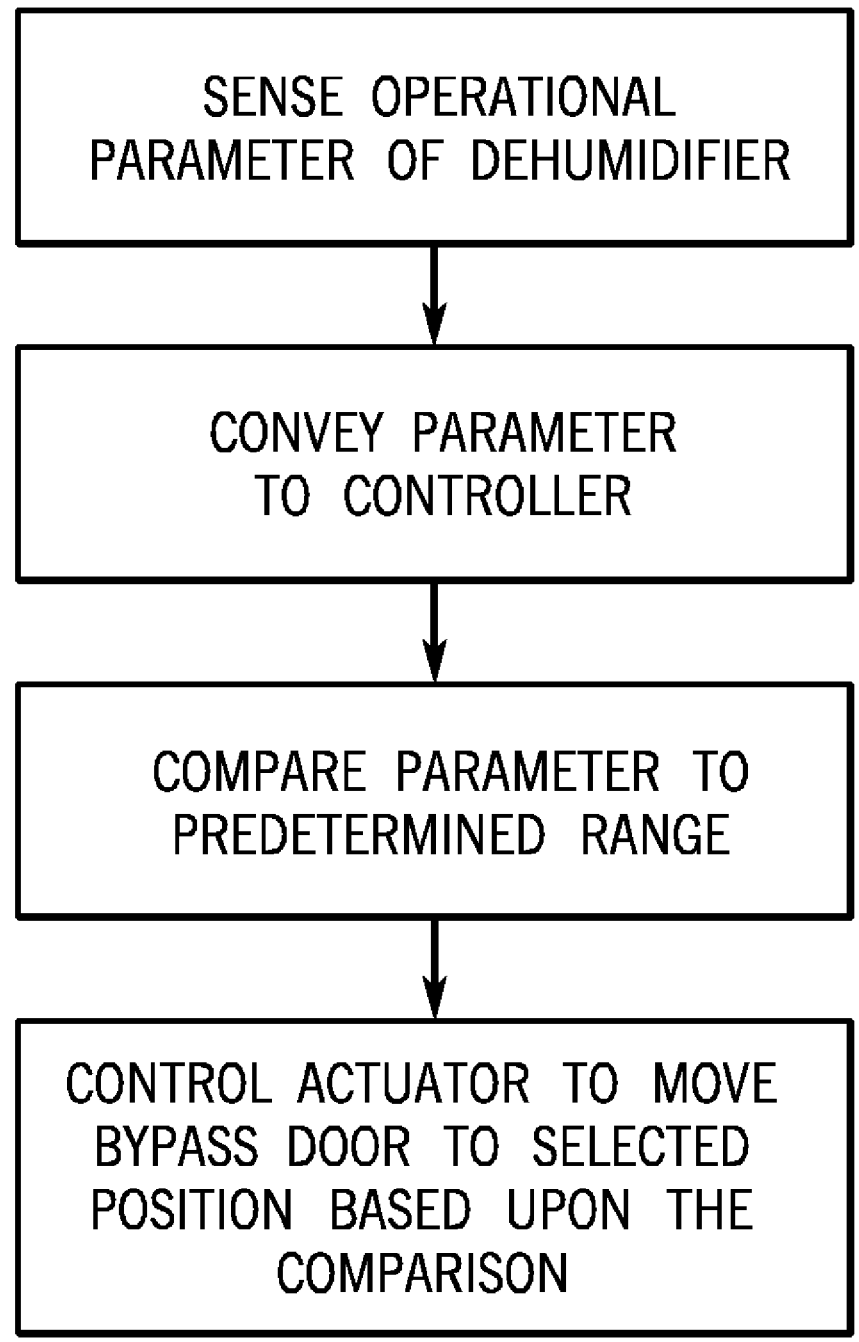

FIG. 26 is a flowchart illustrating an example of a method according to the noted parent application. An operational parameter of the dehumidifier 10 is sensed and conveyed to the controller 126. The parameter is thereby compared to a predetermined range of parameters. This comparison allows the controller 126 to selectively actuate the actuator 124 to move the bypass door 120 to a selected position (i.e. open, closed, or identified optimal door position) based upon the comparison that is made.

A system according to the noted parent application can include the noted dehumidifier 10 having a bypass door 120 selectively positionable to block air flow along the fourth segment 62 and alternatively to allow air flow along the fourth segment 62, an actuator 124, and a controller 126 configured to selectively actuate the actuator 124 and thereby selectively move the bypass door 120 between the open and closed positions. One or more sensors 130 can be associated with the dehumidifier 10 and configured to sense an operational parameter of the dehumidifier 10 and to communicate the sensed parameter to the controller 126, allowing the controller 126 to actuate the actuator 124 based upon the sensed parameter. In a preferred embodiment, the controller 126 compares the sensed parameter to a predetermined range of parameters and then actuates the actuator 124 based upon the comparison. The controller 126 can include a memory stored with the noted predetermined range of parameters and an operating platform that is configured to compare the sensed parameter to the predetermined range of parameters and then to actuate the actuator 124 when the sensed parameter is outside of the predetermined range.

The above-described apparatus, system and method allows for operation of the dehumidifier 10 at optimum performance levels, by either continuously or periodically changing the amount of air bypassing the evaporator 18 and heat exchanger 26 depending for example upon ambient conditions. Provision of the bypass flow 62 reduces the air pressure drop across the entire dehumidification system. Reduced system air pressure drop translates to additional system air flow generated by the air mover. Additional air flow is directed through the condenser. In high temperature applications, additional air flow across the condenser increases condenser heat rejection, which lowers refrigeration high pressure and thus extends operating range. This increases the refrigeration system coefficient of performance (COP). Air flow traveling into the dehumidifier 32 (FIG. 21) is diverted into flow streams 34a and 62. Provisions of the bypass flow 62 diverts a portion of air normally intended for stream 34a reducing the airflow across the evaporator 18. Each amount of air pulled across evaporator contains an amount of sensible heat. Under low humidity high temperature conditions the percentage of sensible heat increases per unit air flow. A given compressor provides a certain amount of capacity. Reducing the airflow under low humidity high temperature conditions reduces the amount of sensible heat required to be removed by compressor capacity per unit air flow. The compressor spends a larger portion of its available power removing latent heat (water) from the air increasing dehumidifier capacity.

The above-described apparatus, system and method thus allows for selective opening of the bypass flow at high temperature conditions to achieve increased capacity and efficiency. Conversely, at lower, medium ambient temperatures/relative humidity conditions, the amount of sensible energy (Btu/lb) that needs to be removed while reaching the dew point is reduced. The refrigeration system thus spends a higher percentage of its energy removing the latent heat (water) from the air, increasing capacity. However a certain temperature is reached wherein the compressor in the refrigeration system overcomes any advantage gained by bypassing air flow around the evaporator and heat exchanger. The refrigeration COP becomes less affected by the high side refrigerant pressure as the air inlet temperature drops. The low side refrigerant pressure becomes the driving function of the COP as the inlet refrigerant pressure drops. At lower refrigerant pressures, the evaporator requires additional load to raise the refrigerant pressure to maintain high COP (efficiencies). Thus, closing the bypass door 120 diverts additional air flow (heat load) to the evaporator and/or heat exchanger.

The noted parent invention thus provides increased efficiency and capacity compared to the prior art. Maintaining the bypass door 120 open provides advantages for high ambient temperature applications. Maintaining the bypass door 120 closed provides advantages for medium temperature applications.

The noted parent invention also provides significant commercial advantages over the prior art. Faster drying periods through maximization of efficiencies and/or capacity throughout the dry-down cycle can be obtained provided. The described example allows for hands-free operation and easy setup, and minimizes defrost periods by ensuring the air flow, when required, is not bypassing the evaporator and increasing the load on the evaporator. Increased load on the evaporator warms the refrigerant temperature, thus postponing defrost conditions.

Present Application

FIGS. 27-33 illustrate the present invention and use like reference numerals from above where appropriate to facilitate understanding.

FIG. 27 shows a defrost bypass dehumidifier 140 for use in the above noted cabinet 30 having compressor 12 for delivering hot compressed refrigerant, condenser coil 14 receiving the refrigerant from the compressor and condensing same, expansion device 16 receiving refrigerant from the condenser coil and expanding same, and evaporator coil 18 receiving refrigerant from the expansion device and evaporating same and delivering the refrigerant to the compressor. As above, the refrigerant is circulated from compressor 12 to condenser 14 to expansion device 16 to evaporator coil 18 and back to compressor 12 in a refrigeration cycle. Cabinet 30 has an air flow path therethrough including a first segment 34 passing ambient air through a pre-cool heat exchanger 26a to evaporator coil 18, a second segment 36 passing air from evaporator coil 18 to condenser coil 14, a third segment 38 discharging air from the condenser coil 14, and a fourth segment 142 passing ambient air to evaporator coil 18. Fourth segment 142 passes ambient air to evaporator coil 18 in parallel with first segment 34 and bypasses pre-cool heat exchanger 26a. The noted first, second, and third segments of the air flow path 34, 36, 38, respectively, are in series from upstream to downstream, respectively. The fourth segment 142 is in parallel with first segment 34.

First segment 34 of the air flow path has first and second subsegments 34a and 34b. First subsegment 34a supplies air to pre-cool heat exchanger 26a. Second subsegment 34b supplies air from pre-cool heat exchanger 26a to evaporator coil 18. Fourth segment 142 is preferably in parallel with at least the noted second subsegment 34b, and in the embodiment of FIG. 27 is in parallel with both of the noted first and second subsegments 34a and 34b. Fourth segment 142 merges with second subsegment 34b downstream of pre-cool heat exchanger 26a and upstream of evaporator coil 18.

In FIG. 28, the air flow path has a fifth segment provided by the above noted segment 62 passing ambient air to condenser coil 14. Fourth segment 142 passes ambient air to evaporator coil 18 in parallel with first segment 34 and bypasses pre-cool heat exchanger 26a. Fifth segment 62 passes ambient air to condenser coil 14 in parallel with second segment 36 and bypasses evaporator coil 18. In FIG. 28, first, second and third segments 34, 36, and 38 are in series from upstream to downstream, respectively, and fourth segment 142 is in parallel with first segment 34, and fifth segment 62 is in parallel with second segment 36. In FIG. 28, fifth segment 62 is also in parallel with first segment 34. In FIG. 28, fifth segment 62 is also in parallel with fourth segment 142.

In FIG. 29, fourth segment 142 has first and second subsegments 142a and 142b. First subsegment 142a of fourth segment 142 receives ambient air. Second subsegment 142b of fourth segment 142 passes the ambient air to evaporator coil 18. Fifth segment 62 is in parallel with second subsegment 142b of fourth segment 142. Also in FIG. 29, fifth segment 62 is in series with first subsegment 142a of fourth segment 142.

The above noted bypass door 120 and associated circuitry may be provided along bypass path segment 142, FIG. 30.

In cabinet 30, as above described, bypass segment 142 may be provided by flow path segment 64c, FIG. 31, passing downwardly through grate 64 where a portion of the heat exchanger 26 has been removed, to thus provide the noted bypass flow segment 142 to evaporator coil 18 in parallel with flow path segment 64a, FIGS. 31, 32. In a further embodiment, bypass segment 142 may be provided by flow path segment 64d, FIG. 33, passing downwardly through grate 64 and then variably controlled through door 144 to flow to evaporator coil 18. Bypass door 144 may be controlled as above described in conjunction with door 120, to variably control the inlet air bypassing the pre-cool heat exchanger 26a and instead flowing directly to evaporator coil 18.

In one embodiment, the system allows all or a portion of the air to bypass the air to air heat exchanger 26 at pre-cool heat exchanger 26a and instead flow directly to evaporator coil 18. Bypassing the pre-cool heat exchanger 26a provides warmer air to the evaporator.

Dehumidifiers need to run in a variety of applications. As described above, an air to air heat exchanger 26 may be used to improve performance and efficiency using cool air leaving the evaporator to pre-cool the ambient air entering the cabinet. This technique of using an air to air heat exchanger is an effective way to control heat flow in warmer operating environments. In warmer environments, the compressor capacity is a significant contributing factor in overall capacity of the dehumidifier. In lower temperature ambient environments, the compressor has excess capacity to drive the suction temperatures of the dehumidifier refrigeration system below freezing. When the compressor pushes the suction temperature below freezing, it is desirable to bypass a portion of the air flow around the heat exchanger and instead directly to the evaporator instead of the condenser. Bypass segment 142 allows all or a portion of the inlet ambient air at 32 to bypass the pre-cool heat exchanger 26*a* and instead flow directly at bypass segment 142 to evaporator coil 18. The opening, e.g. at 64*c* in grate 64, may or may not be controlled by a damper or bypass door 120, regulating flow. As the inlet temperature drops, the amount of available energy stored (BTU/lb.) in each pound of dry air is reduced. The compressor and evaporator remove heat from the incoming air. Temperature and humidity from the incoming air are removed as the air passes through the evaporator. When inlet air conditions drop below a given point the compressor/evaporator capacity will exceed the energy stored in the inlet air, dropping the air temperature below freezing. When air temperature drops below freezing, ice or frost begins to form on the evaporator fins. Ice formation on the evaporator fins forms an additional insulation layer between the refrigerant and the air traveling across the evaporator, which additional thickness reduces the heat transfer coefficient between the refrigerant and the air. The additional insulation layer of ice also reduces the open area or space that the air may pass through, which reduction of open area causes an increase in air pressure drop across the evaporator. The larger air pressure drop causes a reduction of air flow generated through the air moving device provided by a fan, impeller or the like. When the evaporator coil freezes, the system must go through a defrost cycle. Typically, the compressor turns off during the defrost cycle. Air continues to pass over the evaporator. The warmer air heats the evaporator, melting the ice. During the defrost cycle, since the compressor is no longer powered, the dehumidifier no longer removes moisture from the air. Typically, when the defrost duration occurs, air continues to move across the evaporator. As the air moves across the evaporator in the defrost mode, water is entrained back into the air stream. The bypass of the evaporator postpones icing of the evaporator coil to a lower inlet temperature condition.

Bypassing the air around the pre-cool heat exchanger 26*a* removes the latter's pre-cooling effect. Removing the pre-cooling and heat transfer between the inlet air and the air exiting the evaporator provides a warmer air temperature (higher available energy) to the evaporator inlet. The warmer air temperature postpones ice build-up on the evaporator. Bypassing the air around pre-cool heat exchanger 26*a* increases the open area available for air flow therethrough. Larger open area facilitates lower air pressure drop, resulting in an increase in air flow generated by the air mover, e.g. as provided by the noted impeller. The increased system air flow increases air flow across the evaporator. Additional air flow across the evaporator increases the amount of heat available in the inlet air, which increased available heat delays ice build-up on the evaporator. The system provides a desirable increase in capacity, thus providing additional air flow at lower ambient temperatures, lead to additional water removal from the air at the same conditions. Additional air flow increases the heat available at the evaporator inlet. Additional heat to the evaporator coil drops the ambient temperature at which ice formation starts. Reducing the amount of time the unit is in the defrost cycle increases the compressor on-time. Longer compressor on-time means more water removal.

Bypassing the air at bypass flow segment 142 around pre-cool heat exchanger 26*a* reduces the pre-cooling effect. Reduced pre-cooling of the evaporator inlet postpones ice build-up. Ice build-up will begin at lower ambient temperatures. Reducing the amount of time the unit is in the defrost cycle increases the compressor on-time, which in turn provides more water removal, as noted. The system provides increased efficiency. Additional air flow through the evaporator results in additional heat transfer. The added heat transfer through the evaporator results in higher suction pressures which in turn produces higher COP's (coefficients of performance). The additional ambient temperature ranges in which ice no longer forms on the evaporator through the use of the noted bypass technique provides an increase in coil heat transfer efficiency. The film of ice that would normally freeze on the evaporator fins no longer creates an insulation barrier of ice, or minimizes same, thus increasing the evaporator efficiency through the same range and/or extended ranges. Increasing the load on the evaporator minimizes the amount of time the evaporator will be in the defrost mode. Additional air flow through the bypass when completely open causes the ice accumulated on the evaporator to thaw faster. Faster thawing shortens the defrost cycle and shortens the time when the compressor is off, increasing capacity.

In some embodiments of the systems described herein, various commercial advantages are enabled by the noted defrost bypass technology. One advantage is faster drying times in cooler ambient temperatures due to the additional capacity. Another advantage is the reduction in the amount of time the dehumidifier is in the defrost mode, thus reducing the length of time the dehumidifier is not removing water from the air, and reducing the amount of moisture which is otherwise entrained back into the air flow. Another advantage is that the compressor will cycle less. The ambient conditions of the area in which the dehumidifier is operating will exhibit a reduction in humidity level swings as the compressor cycles. Another advantage is that the system will better control the ambient conditions of the environment, including use of the noted bypass door 120 which may be moved into various positions changing the capacity of the system, as noted, by moving the door into a number of positions and altering the capacity of the system maintaining a uniform humidity level in the affected area. Another advantage is the minimization of defrost time by increasing the air flow, when required, to the evaporator and increasing the load on the evaporator. Increased load on the evaporator warms the refrigerant temperature, postponing defrost conditions. Another advantage is the extension of the usable operating range of the dehumidifier.

Various options and alternate embodiments are possible with the present evaporator bypass technique. Inlet air enters the unit, through an optional air filter if desired, and splits into two paths 34 and 142, with part of the air stream 34 passing through pre-cool heat exchanger 26*a*, with heat being transferred from the air to cool same, which cooled air exits at 34*b* and mixes with the air from bypass segment 142 and travels into evaporator 18 where heat is rejected from the mixed air to the cold refrigerant in the evaporator, whereafter the cold air passes through re-heat heat exchanger 26*b* and then along segment 36 and through hot condenser 14 absorbing heat, whereafter the air is discharged at 38. The bypass segment or opening 142 may if desired be manually or automatically controlled, e.g. by a bypass door 120 as above described, or the like. Such door may be electrically, thermally or mechanically driven and move to increase or decrease the amount of bypass air along segment 142 to evaporator 18, to increase or decrease the amount of heat load on the evaporator. Changing the heat load on the evaporator optimizes the operating conditions of the refrigeration system. Changing the amount of open area along bypass flow segment 142 allows the system to maintain the coldest evaporator possible without permitting ice to form on the evaporator.

In one embodiment, the defrost bypass may be controlled by sensing inlet air conditions. Inlet temperatures over 75° F. should typically have the bypass opening or flow segment 142 closed because the evaporator should not be icing in these conditions anyways. In addition to an inlet air sensor, e.g. 130, another sensor may be placed in the air outlet stream of the evaporator, which sensor measures the air temperature coming from the coldest portion of the evaporator. The sensor would drive the noted bypass door 120 to increase or decrease the flow area of bypass segment 142. As the air temperature approaches freezing, the bypass door would incrementally open. Addition warm air would be allowed to mix into the evaporator, raising the outlet temperature of the evaporator. A sensor may be placed to measure the refrigerant conditions of the evaporator. The sensor would drive the bypass door actuator to increase or decrease the open flow area of the bypass passage segment 142. As the refrigerant temperature reaches a predetermined value, e.g. between 25° F. and 32° F., the door would change the amount of evaporator bypass door opening.

In some embodiments of the systems described herein, various engineering advantages are provided. One advantage is increased capacity. Increasing and decreasing the load on the evaporator by moving the evaporator bypass door between less open and more open positions allows the compressor to remove a maximum amount of water running at its maximum efficiency. Another advantage is that swings in humidity will last for a shorter time interval. Increasing and decreasing the load on the evaporator minimizes the amount of time the evaporator will be in the defrost mode. During defrost mode, an automated door may ensure the bypass passage opening along segment 142 is maximized. Additional load from the bypass passage segment when completely open will cause the ice accumulated on the evaporator to thaw faster. Another advantage is that reducing the load on the evaporator lowers the temperatures at which ice build-up occurs. The evaporator will not ice over at lower temperatures where it originally would have frozen. Another advantage is that a more stable environment is created for the ambient application. Another advantage is increased efficiencies in optimized air flow through the evaporator producing higher COP's, and ability to maintain the bypassed closed provides advantages for medium and high temperature applications, and the enablement of extended operating ranges as inlet conditions require. There are also other advantages, including faster drying time through maximization of efficiencies and/or capacity throughout the dry-down cycle, hands-free operation, minimization of defrost intervals by providing air flow, when required, bypassing directly to and through the evaporator and increasing the load on the evaporator, which increased load warms the refrigerant temperature, postponing defrost conditions, and stable outlet conditions including lowering the temperature at which the system cycles and enabling an extended range of operating temperatures, and minimizing humidity variation as the system cycles on and off. As noted, a sensing probe may be mounted in the inlet air stream prior to heat transfer devices, which probe may give continual feedback to the control system. If an air filter is used, the probe may be mounted in the air stream before or after the air filter. In one embodiment, the mounting location of the probe is on the evaporator outlet tube. The door is controlled by the temperature difference between the refrigerant in the evaporator outlet tube and 32° F.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims. Each limitation in the appended claims is intended to invoke interpretation under 35 U.S.C. §112, sixth paragraph, only if the terms "means for" or "step for" are explicitly recited in the respective limitation.

What is claimed is:

1. A dehumidifier comprising:
a cabinet;
a compressor in said cabinet for delivering hot compressed refrigerant;
a condenser coil in said cabinet and receiving refrigerant from said compressor and condensing same;
an expansion device in said cabinet and receiving refrigerant from said condenser coil and expanding same;
an evaporator coil in said cabinet and receiving refrigerant from said expansion device and evaporating same, and delivering said refrigerant to said compressor;
said refrigerant being circulated from said compressor to said condenser coil to said expansion device to said evaporator coil and back to said compressor in a refrigeration cycle;
said cabinet having an air flow path therethrough comprising:
a first segment passing ambient air through a heat exchanger to said evaporator coil;
a second segment passing air from said evaporator coil to said condenser coil;
a third segment discharging air from said condenser coil;
a fourth segment passing ambient air to said evaporator coil.

2. The dehumidifier according to claim 1 wherein said fourth segment of said air flow path passes ambient air to said evaporator coil in parallel with said first segment of said air flow path and bypasses said heat exchanger.

3. The dehumidifier according to claim 1 wherein said first, second, and third segments of said air flow path are series from upstream to downstream, respectively, and said fourth segment of said air flow path is in parallel with said first segment of said air flow path.

4. The dehumidifier according to claim 3 wherein said first segment of said air flow path has first and second subsegments, said first subsegment supplies air to said heat exchanger, said second subsegment supplies air from said heat exchanger to said evaporator coil, and said fourth segment is in parallel with at least said second subsegment.

5. The dehumidifier according to claim 4 wherein said fourth segment of said air flow path merges with said second subsegment downstream of said heat exchanger.

6. The dehumidifier according to claim 4 wherein said fourth segment of said air flow path merges with said second subsegment upstream of said evaporator coil.

7. The dehumidifier according to claim 4 wherein said fourth segment of said air flow is in parallel with both of said first and second subsegments.

8. The dehumidifier according to claim 1 wherein said air flow path has a fifth segment passing ambient air to said condenser coil.

9. The dehumidifier according to claim 8 wherein said fourth segment of said air flow path passes ambient air to said evaporator coil in parallel with said first segment of said air flow path and bypasses said heat exchanger, and wherein said fifth segment of said air flow path passes ambient air to said condenser coil in parallel with said second segment of said air flow path and bypasses said evaporator coil.

10. The dehumidifier according to claim 8 wherein said first, second, and third segments of said air flow path are in series from upstream to downstream, respectively, and said fourth segment of said air flow path is in parallel with said first segment of said air flow path, and said fifth segment of said air flow path is in parallel with said second segment of said air flow path.

11. The dehumidifier according to claim 10 wherein said fifth segment of said air flow path is in parallel with said first segment of said air flow path.

12. The dehumidifier according to claim 10 wherein said fifth segment of said air flow path is in parallel with said fourth segment of said air flow path.

13. The dehumidifier according to claim 10 wherein said fifth segment of said air flow path is in parallel with both of said first and fourth segments of said air flow path.

14. The dehumidifier according to claim 4 wherein said air flow path has a fifth segment passing ambient air to said condenser coil.

15. The dehumidifier according to claim 14 wherein said fourth segment of said air flow path has first and second subsegments, said first subsegment of said fourth segment receives ambient air, said second subsegment of said fourth segment passes said ambient air to said evaporator coil, and wherein said fifth segment of said air flow path is in parallel with said second subsegment of said fourth segment of said air flow path.

16. The dehumidifier according to claim 15 wherein said fifth segment of said air flow path is in series with said first subsegment of said fourth segment of said air flow path.

17. A defrost bypass dehumidifier comprising:
a cabinet;
a compressor in said cabinet for delivering hot compressed refrigerant;
a condenser coil in said cabinet and receiving refrigerant from said compressor and condensing same;
an expansion device in said cabinet and receiving refrigerant from said condenser coil and expanding same;
an evaporator coil in said cabinet and receiving refrigerant from said expansion device and evaporating same, and delivering said refrigerant to said compressor;
said refrigerant being circulated from said condenser to said condenser coil to said expansion device to said evaporator coil and back to said compressor in a refrigeration cycle;
said cabinet having an air flow path therethrough comprising:
a first segment passing ambient air through a pre-cool heat exchanger to provide pre-cooled air to said evaporator coil;
a second segment passing air from said evaporator coil to said condenser coil;
a third segment discharging air from said condenser coil;
a fourth segment passing ambient air to said evaporator coil in parallel with said first segment and bypassing said pre-cool heat exchanger.

18. The defrost bypass dehumidifier according to claim 17 wherein said first, second, and third segments of said air flow path are series from upstream to downstream, respectively, and said fourth segment of said air flow path is in parallel with said first segment of said air flow path.

19. The defrost bypass dehumidifier according to claim 18 wherein said first segment of said air flow path has first and second subsegments, said first subsegment supplies air to said pre-cool heat exchanger, said second subsegment supplies air from said pre-cool heat exchanger to said evaporator coil, said fourth segment is parallel with at least said second subsegment, said fourth segment merges with said second subsegment downstream of said pre-cool heat exchanger and upstream of said evaporator coil.

20. The defrost bypass dehumidifier according to claim 19 wherein said air flow path has a fifth segment passing ambient air to said condenser coil and bypassing said evaporator coil, wherein said first, second, and third segments of said air flow path are in series from upstream to downstream, respectively, said fourth segment of said air flow path is in parallel with said first segment of said air flow path, and said fifth segment of said air flow path is in parallel with said second segment of said air flow path.

* * * * *